(12) United States Patent
Siu et al.

(10) Patent No.: US 11,251,430 B2
(45) Date of Patent: Feb. 15, 2022

(54) ε-VOPO$_4$ CATHODE FOR LITHIUM ION BATTERIES

(71) Applicant: The Research Foundation for the State University of New York, Binghamton, NY (US)

(72) Inventors: Carrie Siu, Philadelphia, PA (US); M. Stanley Whittingham, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 295 days.

(21) Appl. No.: 16/291,617

(22) Filed: Mar. 4, 2019

(65) Prior Publication Data
US 2019/0273257 A1 Sep. 5, 2019

Related U.S. Application Data

(60) Provisional application No. 62/638,893, filed on Mar. 5, 2018.

(51) Int. Cl.
*H01M 4/58* (2010.01)
*H01M 4/62* (2006.01)
(Continued)

(52) U.S. Cl.
CPC ......... *H01M 4/5825* (2013.01); *C01B 25/372* (2013.01); *H01M 4/136* (2013.01);
(Continued)

(58) Field of Classification Search
CPC .. H01M 4/136; H01M 4/1397; H01M 4/2825; H01M 4/623; H01M 4/625; H01M 2004/021; H01M 2004/028; H01M 10/0525; C01B 25/372; C01P 2002/72; C01P 2002/90; C01P 2004/03; C01P 2004/04; Y02E 60/10
See application file for complete search history.

(56) References Cited

U.S. PATENT DOCUMENTS 4,355,162 A 10/1982 Johnson
4,376,709 A 3/1983 Johnson
(Continued)

OTHER PUBLICATIONS

Berrah, Fadila, et al. "The vanadium monophosphates AVOPO4: Synthesis of a second form β-KVOPQ4 and structural relationships in the series." Solid state sciences 3.4 (2001): 477-482.
(Continued)

*Primary Examiner* — Brittany L Raymond
(74) *Attorney, Agent, or Firm* — Hoffberg & Associates; Steven M. Hoffberg

(57) ABSTRACT

The epsilon polymorph of vanadyl phosphate, ε-VOPO$_4$, made from the solvothermally synthesized H$_2$VOPO$_4$, is a high density cathode material for lithium-ion batteries optimized to reversibly intercalate two Li-ions to reach the full theoretical capacity at least 50 cycles with a coulombic efficiency of 98%. This material adopts a stable 3D tunnel structure and can extract two Li-ions per vanadium ion, giving a theoretical capacity of 305 mAh/g, with an upper charge/discharge plateau at around 4.0 V, and one lower at around 2.5 V.

20 Claims, 6 Drawing Sheets

Cycle performance at C/20, 1C=2Li

(51) Int. Cl.
  *H01M 10/0525* (2010.01)
  *H01M 4/136* (2010.01)
  *H01M 4/1397* (2010.01)
  *C01B 25/37* (2006.01)
  *H01M 4/02* (2006.01)

(52) U.S. Cl.
  CPC ......... *H01M 4/1397* (2013.01); *H01M 4/623* (2013.01); *H01M 4/625* (2013.01); *H01M 10/0525* (2013.01); *C01P 2002/72* (2013.01); *C01P 2002/90* (2013.01); *C01P 2004/03* (2013.01); *C01P 2004/04* (2013.01); *H01M 2004/021* (2013.01); *H01M 2004/028* (2013.01)

(56) References Cited

U.S. PATENT DOCUMENTS

| | | |
|---|---|---|
| 4,459,406 A | 7/1984 | Johnson |
| 4,465,743 A | 8/1984 | Skarstad |
| 4,619,874 A | 10/1986 | Skarstad et al. |
| 4,744,787 A | 5/1988 | Phipps et al. |
| 5,061,581 A | 10/1991 | Narang et al. |
| 5,114,809 A | 5/1992 | Nakacho et al. |
| 5,135,477 A | 8/1992 | Untereker et al. |
| 5,153,080 A | 10/1992 | Inubushi et al. |
| 5,415,628 A | 5/1995 | Untereker et al. |
| 5,419,890 A | 5/1995 | Saidi |
| 5,437,692 A | 8/1995 | Dasgupta et al. |
| 5,443,809 A | 8/1995 | Olsen |
| 5,453,261 A | 9/1995 | Saidi et al. |
| 5,482,697 A | 1/1996 | Saidi |
| 5,498,489 A | 3/1996 | Dasgupta et al. |
| 5,512,389 A | 4/1996 | Dasgupta et al. |
| 5,573,503 A | 11/1996 | Untereker et al. |
| 5,576,120 A | 11/1996 | Saidi |
| 5,599,643 A | 2/1997 | Plichta et al. |
| 5,639,577 A | 6/1997 | Takeuchi et al. |
| 5,667,916 A | 9/1997 | Ebel et al. |
| 5,711,761 A | 1/1998 | Untereker et al. |
| 5,731,104 A | 3/1998 | Ventura et al. |
| 5,759,715 A | 6/1998 | Barker et al. |
| 5,849,434 A | 12/1998 | Miura et al. |
| 5,851,696 A | 12/1998 | Saidi et al. |
| 6,007,945 A | 12/1999 | Jacobs et al. |
| 6,015,638 A | 1/2000 | Ventura et al. |
| 6,124,057 A | 9/2000 | Ito et al. |
| 6,156,395 A | 12/2000 | Zhang et al. |
| 6,225,007 B1 | 5/2001 | Horne et al. |
| 6,331,282 B1 | 12/2001 | Manthiram et al. |
| 6,337,155 B1 | 1/2002 | Takei et al. |
| 6,361,755 B1 | 3/2002 | Manthiram et al. |
| 6,391,494 B2 | 5/2002 | Reitz et al. |
| 6,403,253 B1 | 6/2002 | Wainwright et al. |
| 6,492,061 B1 | 12/2002 | Gauthier et al. |
| 6,503,646 B1 | 1/2003 | Ghantous et al. |
| 6,528,033 B1 | 3/2003 | Barker et al. |
| 6,645,452 B1 | 11/2003 | Barker et al. |
| 6,653,022 B2 | 11/2003 | Nordlinder et al. |
| 6,702,961 B2 | 3/2004 | Barker et al. |
| 6,716,372 B2 | 4/2004 | Barker et al. |
| 6,723,470 B2 | 4/2004 | Barker et al. |
| 6,730,437 B2 | 5/2004 | Leising et al. |
| 6,749,966 B2 | 6/2004 | Reitz et al. |
| 6,805,999 B2 | 10/2004 | Lee et al. |
| 6,838,023 B2 | 1/2005 | Torardi |
| 6,844,047 B2 | 1/2005 | Kaminsky et al. |
| 6,855,273 B2 | 2/2005 | Ravet et al. |
| 6,859,297 B2 | 2/2005 | Lee et al. |
| 6,872,492 B2 | 3/2005 | Barker et al. |
| 6,884,544 B2 | 4/2005 | Barker et al. |
| 6,888,663 B2 | 5/2005 | Bourdelais et al. |
| 6,913,855 B2 | 7/2005 | Stoker et al. |
| 6,958,860 B2 | 10/2005 | Dontula et al. |
| 6,960,331 B2 | 11/2005 | Barker et al. |
| 6,962,666 B2 | 11/2005 | Ravet et al. |
| 7,001,690 B2 | 2/2006 | Barker et al. |
| 7,026,072 B2 | 4/2006 | Barker et al. |
| 7,041,239 B2 | 5/2006 | Barker et al. |
| 7,045,249 B2 | 5/2006 | Nanjundaswamy et al. |
| 7,192,564 B2 | 3/2007 | Cardarelli et al. |
| 7,198,869 B2 | 4/2007 | Ghantous et al. |
| 7,300,722 B2 | 11/2007 | Christian et al. |
| 7,338,734 B2 | 3/2008 | Chiang et al. |
| 7,344,659 B2 | 3/2008 | Ravet et al. |
| 7,348,100 B2 | 3/2008 | Adamson et al. |
| 7,383,083 B2 | 6/2008 | Fischer et al. |
| 7,422,823 B2 | 9/2008 | Saidi et al. |
| 7,438,992 B2 | 10/2008 | Barker et al. |
| 7,482,097 B2 | 1/2009 | Saidi et al. |
| 7,632,602 B2 | 12/2009 | Lee et al. |
| 7,722,787 B2 | 5/2010 | Horne et al. |
| 7,759,008 B2 | 7/2010 | Barker et al. |
| 7,771,628 B2 | 8/2010 | Barker et al. |
| 7,790,319 B2 | 9/2010 | Faulkner |
| 7,815,819 B2 | 10/2010 | Ravet et al. |
| 7,901,810 B2 | 3/2011 | Barker et al. |
| 7,906,239 B2 | 3/2011 | Watanabe et al. |
| 7,927,742 B2 | 4/2011 | Scott et al. |
| 7,939,201 B2 | 5/2011 | Chiang et al. |
| 7,952,090 B2 | 5/2011 | Kugler |
| 7,955,733 B2 | 6/2011 | Armand et al. |
| 7,960,058 B2 | 6/2011 | Goodenough et al. |
| 7,960,059 B2 | 6/2011 | Adamson et al. |
| 7,964,308 B2 | 6/2011 | Goodenough et al. |
| 7,972,728 B2 | 7/2011 | Goodenough et al. |
| 7,988,746 B2 | 8/2011 | Chiang et al. |
| 7,998,617 B2 | 8/2011 | Armand et al. |
| 8,003,250 B2 | 8/2011 | Chiang et al. |
| 8,057,936 B2 | 11/2011 | Chiang et al. |
| 8,067,117 B2 | 11/2011 | Goodenough et al. |
| 8,088,512 B2 | 1/2012 | Gozdz et al. |
| 8,119,285 B2 | 2/2012 | Hatta et al. |
| 8,148,009 B2 | 4/2012 | Chiang et al. |
| 8,148,013 B2 | 4/2012 | Chiang et al. |
| 8,158,090 B2 | 4/2012 | Chiang et al. |
| 8,168,326 B2 | 5/2012 | Chiang et al. |
| 8,173,049 B2 | 5/2012 | Ravet et al. |
| 8,178,239 B2 | 5/2012 | Hatta et al. |
| 8,206,468 B2 | 6/2012 | Chiang et al. |
| 8,206,469 B2 | 6/2012 | Chiang et al. |
| 8,218,351 B2 | 7/2012 | Bloch et al. |
| 8,241,789 B2 | 8/2012 | Chiang et al. |
| 8,241,792 B2 | 8/2012 | Kaneko et al. |
| 8,257,616 B2 | 9/2012 | Ravel et al. |
| 8,277,975 B2 | 10/2012 | Chiang et al. |
| 8,282,691 B2 | 10/2012 | Goodenough et al. |
| 8,309,242 B2 | 11/2012 | Wei et al. |
| 8,318,352 B2 | 11/2012 | Saidi et al. |
| 8,318,353 B2 | 11/2012 | Faulkner |
| 8,323,831 B2 | 12/2012 | Wilkins et al. |
| 8,323,832 B2 | 12/2012 | Chiang et al. |
| 8,329,071 B2 | 12/2012 | Wang et al. |
| 8,337,723 B2 | 12/2012 | Hashiba et al. |
| 8,361,661 B2 | 1/2013 | Doe et al. |
| 8,383,269 B2 | 2/2013 | Scott et al. |
| 8,420,258 B2 | 4/2013 | Rojeski |
| 8,435,678 B2 | 5/2013 | Wixom et al. |
| 8,435,738 B2 | 5/2013 | Holmes |
| 8,445,135 B2 | 5/2013 | Sano et al. |
| 8,449,980 B2 | 5/2013 | Suzuki et al. |
| 8,475,739 B2 | 7/2013 | Holmes et al. |
| 8,481,208 B2 | 7/2013 | Riley, Jr. et al. |
| 8,491,861 B2 | 7/2013 | Evenson et al. |
| 8,492,031 B2 | 7/2013 | Suzuki et al. |
| 8,506,847 B2 | 8/2013 | Hibst et al. |
| 8,506,851 B2 | 8/2013 | Ravet et al. |
| 8,506,852 B2 | 8/2013 | Ravet et al. |
| 8,580,430 B2 | 11/2013 | Chiang et al. |
| 8,586,238 B2 | 11/2013 | Chiang et al. |
| 8,614,020 B2 | 12/2013 | Kondo et al. |
| 8,617,430 B2 | 12/2013 | Chiang et al. |
| 8,617,745 B2 | 12/2013 | Gozdz et al. |
| 8,632,904 B2 | 1/2014 | Guyomard et al. |

(56) References Cited

U.S. PATENT DOCUMENTS

| | | |
|---|---|---|
| 8,652,683 B2 | 2/2014 | Rojeski |
| 8,658,310 B2 | 2/2014 | Rojeski |
| 8,709,647 B2 | 4/2014 | Gozdz et al. |
| 8,722,227 B2 | 5/2014 | Chiang et al. |
| 8,722,242 B2 | 5/2014 | Muldoon et al. |
| 8,734,539 B2 | 5/2014 | Tokita et al. |
| 8,784,694 B2 | 7/2014 | Kay |
| 8,785,043 B2 | 7/2014 | Armand et al. |
| 8,798,235 B2 | 8/2014 | Ohta et al. |
| 8,798,236 B2 | 8/2014 | Ohta et al. |
| 8,802,295 B2 | 8/2014 | Nesper et al. |
| 8,808,575 B2 | 8/2014 | Hibst et al. |
| 8,808,576 B2 | 8/2014 | Hibst et al. |
| 8,821,763 B2 | 9/2014 | Sano et al. |
| 8,822,080 B2 | 9/2014 | Fujino et al. |
| 8,840,838 B2 | 9/2014 | Holmes et al. |
| 8,852,807 B2 | 10/2014 | Chiang et al. |
| 8,870,976 B2 | 10/2014 | Kondo et al. |
| 8,895,193 B2 | 11/2014 | Abouimrane et al. |
| 8,926,389 B2 | 1/2015 | Nishido |
| 8,929,510 B2 | 1/2015 | Nishino et al. |
| 8,932,762 B2 | 1/2015 | Sano et al. |
| 8,936,871 B2 | 1/2015 | Sano et al. |
| 8,951,676 B2 | 2/2015 | Doe et al. |
| 8,951,680 B2 | 2/2015 | Doe et al. |
| 8,957,442 B2 | 2/2015 | Seo et al. |
| 8,980,453 B2 | 3/2015 | Scott et al. |
| 8,993,171 B2 | 3/2015 | Sano et al. |
| 8,999,282 B2 | 4/2015 | Ceder et al. |
| 8,999,571 B2 | 4/2015 | Chiang et al. |
| 9,000,458 B2 | 4/2015 | Seo et al. |
| 9,006,755 B2 | 4/2015 | Seo et al. |
| 9,029,003 B2 | 5/2015 | Sulaiman Lo et al. |
| 9,044,191 B2 | 6/2015 | Nishino et al. |
| 9,065,093 B2 | 6/2015 | Chiang et al. |
| 9,077,032 B2 | 7/2015 | Doe et al. |
| 9,077,037 B2 | 7/2015 | Hwu et al. |
| 9,093,707 B2 | 7/2015 | Lee et al. |
| 9,105,869 B2 | 8/2015 | Nishido |
| 9,112,210 B2 | 8/2015 | Chen et al. |
| 9,128,015 B2 | 9/2015 | Holmes et al. |
| 9,136,505 B2 | 9/2015 | Sasaki et al. |
| 9,147,874 B2 | 9/2015 | Chen et al. |
| 9,153,839 B2 | 10/2015 | Furuya |
| 9,168,016 B2 | 10/2015 | Ohta et al. |
| 9,172,111 B2 | 10/2015 | Doe et al. |
| 9,190,659 B2 | 11/2015 | Kondo et al. |
| 9,196,923 B2 | 11/2015 | Chang et al. |
| 9,203,084 B2 | 12/2015 | Wang et al. |
| 9,240,612 B2 | 1/2016 | Doe et al. |
| 9,250,229 B2 | 2/2016 | Holmes |
| 9,257,655 B2 | 2/2016 | Suzuki et al. |
| 9,257,718 B2 | 2/2016 | Kondo et al. |
| 9,258,853 B2 | 2/2016 | Nishido et al. |
| 9,268,915 B2 | 2/2016 | Holmes et al. |
| 9,287,578 B2 | 3/2016 | Anderson et al. |
| 9,287,580 B2 | 3/2016 | Jain |
| 9,293,790 B2 | 3/2016 | Doe et al. |
| 9,296,621 B2 | 3/2016 | Feng et al. |
| 9,299,966 B2 | 3/2016 | Chiang et al. |
| 9,305,716 B2 | 4/2016 | Tan et al. |
| 9,318,739 B2 | 4/2016 | Toya et al. |
| 9,318,742 B2 | 4/2016 | Fujino et al. |
| 9,331,283 B2 | 5/2016 | Lim et al. |
| 9,337,481 B2 | 5/2016 | Nesper et al. |
| 9,349,544 B2 | 5/2016 | Rojeski |
| 9,350,018 B2 | 5/2016 | Tsutsumi et al. |
| 9,362,555 B2 | 6/2016 | Chen et al. |
| 9,362,562 B2 | 6/2016 | Armand et al. |
| 9,368,831 B2 | 6/2016 | He et al. |
| 9,385,364 B2 | 7/2016 | Liang et al. |
| 9,391,290 B2 | 7/2016 | Watabe et al. |
| 9,401,528 B2 | 7/2016 | Doe et al. |
| 9,406,930 B2 | 8/2016 | Fukui et al. |
| 9,413,006 B2 | 8/2016 | Kay |
| 9,419,279 B2 | 8/2016 | Yamamura et al. |
| 9,437,866 B2 | 9/2016 | Kikuchi et al. |
| 9,449,765 B2 | 9/2016 | Gardner et al. |
| 9,450,209 B2 | 9/2016 | Seo et al. |
| 9,461,092 B2 | 10/2016 | Seo et al. |
| 9,472,601 B2 | 10/2016 | Seo et al. |
| 9,515,310 B2 | 12/2016 | Cao et al. |
| 9,525,164 B1 | 12/2016 | Aksu et al. |
| 9,527,157 B2 | 12/2016 | Kroll et al. |
| 9,537,109 B2 | 1/2017 | Suzuki et al. |
| 9,548,509 B2 | 1/2017 | Anderson et al. |
| 9,553,312 B2 | 1/2017 | Yamauchi et al. |
| 9,559,351 B2 | 1/2017 | Mori et al. |
| 9,564,641 B2 | 2/2017 | Otsuki et al. |
| 9,581,877 B2 | 2/2017 | Bass et al. |
| 9,583,764 B2 | 2/2017 | Yamauchi et al. |
| 9,592,508 B2 | 3/2017 | Holmes et al. |
| 9,595,697 B2 | 3/2017 | Nishido et al. |
| 9,608,269 B2 | 3/2017 | Barker |
| 9,627,691 B2 | 4/2017 | Xing et al. |
| 9,632,102 B2 | 4/2017 | Holmes et al. |
| 9,634,267 B2 | 4/2017 | Watabe et al. |
| 9,645,143 B2 | 5/2017 | Holmes et al. |
| 9,653,517 B2 | 5/2017 | Uesaka et al. |
| 9,653,730 B2 | 5/2017 | Pitteloud |
| 9,664,702 B2 | 5/2017 | Holmes et al. |
| 9,666,755 B2 | 5/2017 | Shimomura |
| 9,683,314 B2 | 6/2017 | Xu et al. |
| 9,685,656 B2 | 6/2017 | Yamauchi et al. |
| 9,711,793 B2 | 7/2017 | Mizuno et al. |
| 9,719,990 B2 | 8/2017 | Holmes et al. |
| 9,722,247 B2 | 8/2017 | Zhang et al. |
| 9,745,194 B2 | 8/2017 | Kabe et al. |
| 9,771,319 B2 | 9/2017 | Gonzalez Martinez et al. |
| 9,786,913 B2 | 10/2017 | Inoue et al. |
| 9,786,944 B2 | 10/2017 | Chiang et al. |
| 9,793,061 B2 | 10/2017 | Gardner et al. |
| 9,798,214 B2 | 10/2017 | Garcia et al. |
| 9,810,704 B2 | 11/2017 | Holmes et al. |
| 9,819,054 B2 | 11/2017 | Kang et al. |
| 9,853,242 B2 | 12/2017 | Nishido |
| 9,859,557 B2 | 1/2018 | Mori et al. |
| 9,865,877 B2 | 1/2018 | Kang et al. |
| 9,878,305 B2 | 1/2018 | Hossain et al. |
| 9,882,204 B2 | 1/2018 | Ryoshi et al. |
| 9,887,047 B2 | 2/2018 | Tan et al. |
| 9,899,672 B2 | 2/2018 | Zhamu et al. |
| 9,899,710 B2 | 2/2018 | Scott et al. |
| 9,911,985 B2 | 3/2018 | Dong et al. |
| 9,917,271 B2 | 3/2018 | Uesaka et al. |
| 9,923,206 B2 | 3/2018 | Chen et al. |
| 9,929,368 B2 | 3/2018 | Kataishi et al. |
| 9,935,158 B2 | 4/2018 | Seo et al. |
| 9,935,286 B2 | 4/2018 | Watabe et al. |
| 9,935,314 B2 | 4/2018 | Johnson et al. |
| 9,942,972 B2 | 4/2018 | Nishino et al. |
| 9,952,240 B2 | 4/2018 | Holmes et al. |
| 9,954,224 B2 | 4/2018 | Toya et al. |
| 9,960,451 B1 | 5/2018 | Zhamu et al. |
| 9,966,604 B2 | 5/2018 | Kondo et al. |
| 9,997,778 B2 | 6/2018 | Cao et al. |
| 10,007,163 B2 | 6/2018 | Bass et al. |
| 10,008,723 B1 | 6/2018 | Zhamu et al. |
| 10,008,747 B1 | 6/2018 | Zhamu et al. |
| 10,012,664 B2 | 7/2018 | Wasson et al. |
| 10,017,875 B2 | 7/2018 | Toya et al. |
| 10,018,643 B2 | 7/2018 | Holmes et al. |
| 10,044,025 B2 | 8/2018 | Toya et al. |
| 10,050,271 B2 | 8/2018 | Barker et al. |
| 10,069,097 B2 | 9/2018 | Kataishi et al. |
| 10,069,138 B2 | 9/2018 | Mizuno et al. |
| 10,084,156 B2 | 9/2018 | Seo et al. |
| 10,090,516 B2 | 10/2018 | Balaya et al. |
| 10,096,658 B2 | 10/2018 | Watabe et al. |
| 10,109,849 B2 | 10/2018 | Ryoshi et al. |
| 10,109,859 B1 | 10/2018 | Goodenough et al. |
| 10,128,501 B2 | 11/2018 | Fukui et al. |
| 10,130,936 B2 | 11/2018 | Hossain et al. |
| 10,134,998 B2 | 11/2018 | Seo et al. |

(56) References Cited

U.S. PATENT DOCUMENTS

| | | |
|---|---|---|
| 10,153,516 B2 | 12/2018 | Schmitz et al. |
| 10,160,660 B1 | 12/2018 | Rodriguez et al. |
| 10,170,212 B2 | 1/2019 | Barker et al. |
| 10,170,749 B2 | 1/2019 | Zhamu et al. |
| 10,170,789 B2 | 1/2019 | Zhamu et al. |
| 10,199,637 B2 | 2/2019 | Zhamu et al. |
| 10,199,647 B2 | 2/2019 | Chen et al. |
| 10,201,065 B2 | 2/2019 | Ohta et al. |
| 10,207,992 B2 | 2/2019 | Suzuki et al. |
| 10,224,494 B2 | 3/2019 | Watabe et al. |
| 10,230,055 B2 | 3/2019 | Kanamoto et al. |
| 10,230,108 B2 | 3/2019 | Sano et al. |
| 10,243,217 B2 | 3/2019 | Zhamu et al. |
| 10,263,253 B2 | 4/2019 | Nair et al. |
| 10,263,277 B2 | 4/2019 | Pitts et al. |
| 10,263,308 B2 | 4/2019 | McKone et al. |
| 10,270,098 B2 | 4/2019 | Kang et al. |
| 10,276,856 B2 | 4/2019 | Zhamu et al. |
| 10,333,138 B2 | 6/2019 | Goodenough et al. |
| 10,340,470 B2 | 7/2019 | Sasaki et al. |
| 10,361,388 B2 | 7/2019 | Mitsumori et al. |
| 10,361,460 B2 | 7/2019 | Zhamu et al. |
| 10,371,710 B2 | 8/2019 | Wasson et al. |
| 10,388,983 B2 | 8/2019 | Zhamu et al. |
| 10,396,356 B2 | 8/2019 | Toya et al. |
| 10,411,264 B2 | 9/2019 | Pan et al. |
| 10,418,662 B2 | 9/2019 | Zhamu et al. |
| 10,424,787 B2 | 9/2019 | Kamata et al. |
| 10,446,845 B2 | 10/2019 | Goodenough et al. |
| 10,446,853 B2 | 10/2019 | Choi et al. |
| 10,461,134 B2 | 10/2019 | Seo et al. |
| 10,483,533 B2 | 11/2019 | Zhamu et al. |
| 10,490,815 B2 | 11/2019 | Toya et al. |
| 10,493,432 B2 | 12/2019 | Islam et al. |
| 10,516,165 B2 | 12/2019 | Toya et al. |
| 10,518,265 B2 | 12/2019 | Holmes et al. |
| 10,534,009 B2 | 1/2020 | Holmes et al. |
| 10,535,880 B2 | 1/2020 | Zhamu et al. |
| 10,535,892 B2 | 1/2020 | Zhamu et al. |
| 10,553,857 B2 | 2/2020 | Mizuno et al. |
| 10,557,863 B2 | 2/2020 | Holmes et al. |
| 10,559,815 B2 | 2/2020 | Zhamu et al. |
| 10,573,932 B2 | 2/2020 | Yang et al. |
| 10,586,931 B2 | 3/2020 | Kanamoto et al. |
| 10,611,639 B2 | 4/2020 | Sano et al. |
| 10,615,408 B1 | 4/2020 | Fellner et al. |
| 10,615,453 B2 | 4/2020 | Zanotti et al. |
| 10,615,463 B2 | 4/2020 | Scott et al. |
| 10,627,418 B2 | 4/2020 | Wasson et al. |
| 10,637,043 B2 | 4/2020 | Zhamu et al. |
| 10,637,115 B2 | 4/2020 | Licht |
| 10,644,250 B2 | 5/2020 | Watabe et al. |
| 10,644,308 B2 | 5/2020 | Liu et al. |
| 10,658,604 B2 | 5/2020 | Mitsumori et al. |
| 10,661,090 B2 | 5/2020 | Chen et al. |
| 10,669,646 B2 | 6/2020 | Toya et al. |
| 10,673,090 B2 | 6/2020 | Nie et al. |
| 10,693,094 B2 | 6/2020 | Seo et al. |
| 10,697,082 B1 | 6/2020 | Huang et al. |
| 10,698,286 B2 | 6/2020 | Bass et al. |
| 10,727,479 B2 | 7/2020 | Zhamu et al. |
| 10,727,531 B2 | 7/2020 | Zhamu et al. |
| 10,734,635 B2 | 8/2020 | Zhamu et al. |
| 10,734,646 B2 | 8/2020 | He et al. |
| 10,734,648 B2 | 8/2020 | Zhamu et al. |
| 10,734,671 B2 | 8/2020 | Zhamu et al. |
| 10,741,619 B2 | 8/2020 | Seo et al. |
| 10,741,832 B2 | 8/2020 | Sun et al. |
| 10,749,168 B1 | 8/2020 | Johnson et al. |
| 10,756,286 B2 | 8/2020 | Ishisone et al. |
| 10,763,491 B2 | 9/2020 | Takeuchi et al. |
| 10,766,795 B2 | 9/2020 | Su et al. |
| 10,770,721 B2 | 9/2020 | Zhamu et al. |
| 10,772,199 B2 | 9/2020 | Lai et al. |
| 10,777,810 B2 | 9/2020 | He et al. |
| 10,784,509 B2 | 9/2020 | He et al. |
| 10,790,509 B2 | 9/2020 | Uekusa et al. |
| 10,797,113 B2 | 10/2020 | Ohsawa et al. |
| 10,797,313 B2 | 10/2020 | Zhamu et al. |
| 10,818,921 B2 | 10/2020 | Kensaku et al. |
| 10,826,132 B2 | 11/2020 | Smith et al. |
| 10,829,385 B2 | 11/2020 | Matsumoto et al. |
| 10,840,501 B2 | 11/2020 | Hong et al. |
| 10,840,505 B2 | 11/2020 | Zarra et al. |
| 10,840,565 B2 | 11/2020 | Zhamu et al. |
| 10,854,396 B2 | 12/2020 | Yokota et al. |
| 10,862,129 B2 | 12/2020 | Pan et al. |
| 10,868,256 B2 | 12/2020 | Seo et al. |
| 10,873,083 B2 | 12/2020 | Zhamu et al. |
| 10,886,525 B2 | 1/2021 | Singh et al. |
| 10,886,528 B2 | 1/2021 | Pan et al. |
| 10,889,506 B2 | 1/2021 | Rodriguez et al. |
| 10,903,519 B2 | 1/2021 | Pan et al. |
| 10,903,527 B2 | 1/2021 | Liu et al. |
| 10,910,568 B2 | 2/2021 | Watabe et al. |
| 10,910,576 B2 | 2/2021 | Mitsumori et al. |
| 10,916,769 B2 | 2/2021 | Su et al. |
| 10,923,717 B2 | 2/2021 | Kim et al. |
| 10,930,924 B2 | 2/2021 | Zhamu et al. |
| 10,937,965 B2 | 3/2021 | Seo et al. |
| 2001/0046468 A1 | 11/2001 | Reitz et al. |
| 2002/0039687 A1 | 4/2002 | Barker et al. |
| 2002/0064497 A1 | 5/2002 | Horne et al. |
| 2002/0086212 A1 | 7/2002 | Nordlinder et al. |
| 2002/0086214 A1 | 7/2002 | Barker et al. |
| 2002/0142218 A1 | 10/2002 | Reitz et al. |
| 2002/0192553 A1 | 12/2002 | Barker et al. |
| 2002/0195591 A1 | 12/2002 | Ravet et al. |
| 2003/0003362 A1 | 1/2003 | Leising et al. |
| 2003/0022065 A1 | 1/2003 | Ji-Guang et al. |
| 2003/0073003 A1 | 4/2003 | Barker et al. |
| 2003/0077513 A1 | 4/2003 | Ghantous et al. |
| 2003/0077514 A1 | 4/2003 | Barker et al. |
| 2003/0129492 A1 | 7/2003 | Barker et al. |
| 2003/0162094 A1 | 8/2003 | Lee et al. |
| 2003/0190526 A1 | 10/2003 | Saidi et al. |
| 2003/0190527 A1 | 10/2003 | Pugh et al. |
| 2003/0190528 A1 | 10/2003 | Saidi et al. |
| 2003/0215714 A1 | 11/2003 | Barker et al. |
| 2003/0235761 A1 | 12/2003 | Prabaharan |
| 2004/0005265 A1 | 1/2004 | Chiang et al. |
| 2004/0005500 A1 | 1/2004 | Torardi |
| 2004/0013943 A1 | 1/2004 | Stoker et al. |
| 2004/0016632 A1 | 1/2004 | Barker |
| 2004/0028585 A1 | 2/2004 | Cardarelli et al. |
| 2004/0048157 A1 | 3/2004 | Neudecker et al. |
| 2004/0066556 A1 | 4/2004 | Dontula et al. |
| 2004/0121195 A1 | 6/2004 | Ghantous et al. |
| 2004/0126300 A1 | 7/2004 | Barker et al. |
| 2004/0140458 A1 | 7/2004 | Ravet et al. |
| 2004/0150867 A1 | 8/2004 | Lee et al. |
| 2004/0197654 A1 | 10/2004 | Barker et al. |
| 2004/0262571 A1 | 12/2004 | Barker et al. |
| 2005/0003269 A1 | 1/2005 | Nanjundaswamy et al. |
| 2005/0181283 A1 | 8/2005 | Pugh et al. |
| 2005/0186476 A1 | 8/2005 | Barker et al. |
| 2005/0194567 A1 | 9/2005 | Adamson et al. |
| 2005/0238961 A1 | 10/2005 | Barker et al. |
| 2006/0060827 A1 | 3/2006 | Ravet et al. |
| 2006/0088767 A1 | 4/2006 | Li et al. |
| 2006/0110580 A1 | 5/2006 | Aylward et al. |
| 2006/0194112 A1 | 8/2006 | Barker et al. |
| 2006/0228629 A1 | 10/2006 | Christian et al. |
| 2006/0292444 A1 | 12/2006 | Chiang et al. |
| 2007/0009802 A1 | 1/2007 | Lee et al. |
| 2007/0031732 A1 | 2/2007 | Chiang et al. |
| 2007/0031735 A1 | 2/2007 | Nishimura et al. |
| 2007/0065724 A1 | 3/2007 | Barker et al. |
| 2007/0072034 A1 | 3/2007 | Barker et al. |
| 2007/0082262 A1 | 4/2007 | Nishimura et al. |
| 2007/0141468 A1 | 6/2007 | Barker |
| 2007/0166617 A1 | 7/2007 | Gozdz et al. |
| 2007/0190418 A1 | 8/2007 | Chiang et al. |
| 2007/0248520 A1 | 10/2007 | Faulkner |

(56) References Cited

U.S. PATENT DOCUMENTS

| | | |
|---|---|---|
| 2007/0292747 A1 | 12/2007 | Chiang et al. |
| 2007/0292757 A1 | 12/2007 | Watanabe et al. |
| 2007/0298317 A1 | 12/2007 | Brodd et al. |
| 2008/0014503 A1 | 1/2008 | Kejha |
| 2008/0014507 A1 | 1/2008 | Kejha |
| 2008/0052900 A1 | 3/2008 | Kondo et al. |
| 2008/0057390 A1 | 3/2008 | Kondo et al. |
| 2008/0070113 A1 | 3/2008 | Kondo et al. |
| 2008/0131777 A1 | 6/2008 | Hatta et al. |
| 2008/0138709 A1 | 6/2008 | Hatta et al. |
| 2008/0157024 A1 | 7/2008 | Adamson et al. |
| 2008/0257721 A1 | 10/2008 | Ravet et al. |
| 2008/0261113 A1 | 10/2008 | Huang et al. |
| 2009/0040587 A1 | 2/2009 | Kugler |
| 2009/0061314 A1 | 3/2009 | Dong |
| 2009/0081553 A1 | 3/2009 | Kondo et al. |
| 2009/0214944 A1 | 8/2009 | Rojeski |
| 2009/0220838 A9 | 9/2009 | Barker et al. |
| 2009/0246636 A1 | 10/2009 | Chiang et al. |
| 2009/0253036 A1 | 10/2009 | Owen et al. |
| 2009/0272949 A1 | 11/2009 | Buttry |
| 2009/0303660 A1 | 12/2009 | Nair et al. |
| 2009/0311597 A1 | 12/2009 | Chiang et al. |
| 2009/0311680 A1 | 12/2009 | Nakao et al. |
| 2010/0055573 A1 | 3/2010 | Lee et al. |
| 2010/0075225 A1 | 3/2010 | Wilkins et al. |
| 2010/0078591 A1 | 4/2010 | Sano et al. |
| 2010/0119951 A1 | 5/2010 | Abouimrane et al. |
| 2010/0140560 A1 | 6/2010 | Wang et al. |
| 2010/0143769 A1 | 6/2010 | Lee et al. |
| 2010/0230632 A1 | 9/2010 | Adamson et al. |
| 2010/0233545 A1 | 9/2010 | Sano et al. |
| 2010/0266899 A1 | 10/2010 | Barker et al. |
| 2010/0283012 A1 | 11/2010 | Hibst et al. |
| 2010/0285372 A1 | 11/2010 | Lee et al. |
| 2010/0301281 A1 | 12/2010 | Hibst et al. |
| 2010/0303701 A1 | 12/2010 | Faulkner |
| 2011/0008678 A1 | 1/2011 | Li et al. |
| 2011/0012067 A1 | 1/2011 | Kay |
| 2011/0052473 A1 | 3/2011 | Sano et al. |
| 2011/0052986 A1 | 3/2011 | Barker et al. |
| 2011/0052995 A1 | 3/2011 | Sano et al. |
| 2011/0084238 A1 | 4/2011 | Hibst et al. |
| 2011/0086273 A1 | 4/2011 | Ravet et al. |
| 2011/0097479 A1 | 4/2011 | Ravet et al. |
| 2011/0104534 A1 | 5/2011 | Wei et al. |
| 2011/0117417 A1 | 5/2011 | Pitts |
| 2011/0123866 A1 | 5/2011 | Pan et al. |
| 2011/0159381 A1 | 6/2011 | Doe et al. |
| 2011/0186741 A1 | 8/2011 | Ohta et al. |
| 2011/0188630 A1 | 8/2011 | Ohta et al. |
| 2011/0188633 A1 | 8/2011 | Ohta et al. |
| 2011/0195306 A1 | 8/2011 | Chiang et al. |
| 2011/0200848 A1 | 8/2011 | Chiang et al. |
| 2011/0229765 A1 | 9/2011 | Barker et al. |
| 2011/0274948 A1 | 11/2011 | Duduta et al. |
| 2011/0287316 A1 | 11/2011 | Lu et al. |
| 2011/0317817 A1 | 12/2011 | Nishino et al. |
| 2011/0318652 A1 | 12/2011 | Furuya |
| 2012/0002784 A1 | 1/2012 | Nishino et al. |
| 2012/0064401 A1 | 3/2012 | Liu et al. |
| 2012/0100402 A1 | 4/2012 | Nesper et al. |
| 2012/0138867 A1 | 6/2012 | Liang et al. |
| 2012/0140378 A1 | 6/2012 | Tan et al. |
| 2012/0164499 A1 | 6/2012 | Chiang et al. |
| 2012/0164517 A1 | 6/2012 | Lee et al. |
| 2012/0205676 A1 | 8/2012 | Seo et al. |
| 2012/0205685 A1 | 8/2012 | Seo et al. |
| 2012/0205686 A1 | 8/2012 | Seo et al. |
| 2012/0213919 A1 | 8/2012 | Ravet et al. |
| 2012/0214071 A1 | 8/2012 | Chiang et al. |
| 2012/0214072 A1 | 8/2012 | Ravet et al. |
| 2012/0219856 A1 | 8/2012 | Doe et al. |
| 2012/0219859 A1 | 8/2012 | Doe et al. |
| 2012/0219862 A1 | 8/2012 | Fujino et al. |
| 2012/0237828 A1 | 9/2012 | Tan et al. |
| 2012/0270107 A1 | 10/2012 | Toya et al. |
| 2012/0270109 A1 | 10/2012 | Chiang et al. |
| 2012/0276454 A1 | 11/2012 | Mori et al. |
| 2012/0301787 A1 | 11/2012 | Yamamura et al. |
| 2012/0302697 A1 | 11/2012 | Inada et al. |
| 2012/0003155 A1 | 12/2012 | Chiang et al. |
| 2012/0321953 A1* | 12/2012 | Chen ............... B82Y 30/00 429/219 |
| 2013/0026409 A1 | 1/2013 | Baker et al. |
| 2013/0029207 A1 | 1/2013 | Jain |
| 2013/0034780 A1 | 2/2013 | Muldoon et al. |
| 2013/0043437 A1 | 2/2013 | Wang et al. |
| 2013/0048967 A1 | 2/2013 | Nishido et al. |
| 2013/0052492 A1 | 2/2013 | Schaefer |
| 2013/0059204 A1 | 3/2013 | Holzapfel et al. |
| 2013/0059211 A1 | 3/2013 | Schaefer et al. |
| 2013/0074614 A1 | 3/2013 | Holmes et al. |
| 2013/0078149 A1 | 3/2013 | Holmes et al. |
| 2013/0078520 A1 | 3/2013 | Toya et al. |
| 2013/0078523 A1 | 3/2013 | Rojeski |
| 2013/0078524 A1 | 3/2013 | Rojeski |
| 2013/0078624 A1 | 3/2013 | Holmes et al. |
| 2013/0078625 A1 | 3/2013 | Holmes et al. |
| 2013/0078733 A1 | 3/2013 | Holmes et al. |
| 2013/0079236 A1 | 3/2013 | Holmes |
| 2013/0079599 A1 | 3/2013 | Holmes et al. |
| 2013/0084474 A1 | 4/2013 | Mills |
| 2013/0089486 A1 | 4/2013 | Ceder et al. |
| 2013/0108925 A1 | 5/2013 | Holzapfel |
| 2013/0115521 A1 | 5/2013 | Doe et al. |
| 2013/0119358 A1 | 5/2013 | Sasaki et al. |
| 2013/0137200 A1 | 5/2013 | Shimomura |
| 2013/0153821 A1 | 6/2013 | Evenson et al. |
| 2013/0157126 A1 | 6/2013 | Sulaiman Lo et al. |
| 2013/0157135 A1 | 6/2013 | Zhou et al. |
| 2013/0189590 A1 | 7/2013 | Jean-Marc et al. |
| 2013/0214201 A1 | 8/2013 | Hibst et al. |
| 2013/0214212 A1 | 8/2013 | Hibst et al. |
| 2013/0214462 A1 | 8/2013 | Kikuchi et al. |
| 2013/0216903 A1 | 8/2013 | Pitteloud |
| 2013/0252112 A1 | 9/2013 | Doe et al. |
| 2013/0252114 A1 | 9/2013 | Doe et al. |
| 2013/0260225 A1 | 10/2013 | Doe et al. |
| 2013/0260228 A1 | 10/2013 | Sano et al. |
| 2013/0260238 A1 | 10/2013 | Doe et al. |
| 2013/0273402 A1 | 10/2013 | Tsutsumi et al. |
| 2013/0288129 A1 | 10/2013 | Toya et al. |
| 2013/0300284 A1 | 11/2013 | Nishido |
| 2013/0302673 A1 | 11/2013 | Ravet et al. |
| 2013/0302697 A1 | 11/2013 | Wang et al. |
| 2013/0309561 A1 | 11/2013 | Chen et al. |
| 2013/0316250 A1 | 11/2013 | Khalifah et al. |
| 2013/0323608 A1 | 12/2013 | Chang et al. |
| 2013/0327249 A1 | 12/2013 | Winter et al. |
| 2013/0330603 A1 | 12/2013 | Kroll et al. |
| 2013/0330611 A1 | 12/2013 | Chen et al. |
| 2013/0337331 A1 | 12/2013 | Mori et al. |
| 2013/0344367 A1 | 12/2013 | Chiang et al. |
| 2014/0011090 A1 | 1/2014 | Toya et al. |
| 2014/0027743 A1 | 1/2014 | Nishido |
| 2014/0056797 A1 | 2/2014 | Kabe et al. |
| 2014/0072871 A1 | 3/2014 | Chen et al. |
| 2014/0072879 A1 | 3/2014 | Chen et al. |
| 2014/0072883 A1 | 3/2014 | Kondo et al. |
| 2014/0073043 A1 | 3/2014 | Holmes |
| 2014/0099557 A1 | 4/2014 | Doe et al. |
| 2014/0106214 A1 | 4/2014 | Doe et al. |
| 2014/0127562 A1 | 5/2014 | Nesper et al. |
| 2014/0159011 A1 | 6/2014 | Suzuki et al. |
| 2014/0170476 A1 | 6/2014 | Tan et al. |
| 2014/0170735 A1 | 6/2014 | Holmes |
| 2014/0186238 A1 | 7/2014 | Holmes et al. |
| 2014/0191220 A1 | 7/2014 | Watabe et al. |
| 2014/0212733 A1 | 7/2014 | Johnson et al. |
| 2014/0220450 A1 | 8/2014 | Jilek et al. |
| 2014/0234695 A1 | 8/2014 | Kondo et al. |
| 2014/0234949 A1 | 8/2014 | Wasson et al. |
| 2014/0242445 A1 | 8/2014 | Gozdz et al. |

(56) References Cited

U.S. PATENT DOCUMENTS

| | | |
|---|---|---|
| 2014/0248544 A1 | 9/2014 | Xing et al. |
| 2014/0275685 A1 | 9/2014 | Sanchez Valente et al. |
| 2014/0294721 A1 | 10/2014 | Feng et al. |
| 2014/0295275 A1 | 10/2014 | Kay |
| 2014/0296089 A1 | 10/2014 | Holmes et al. |
| 2014/0302403 A1 | 10/2014 | Doe et al. |
| 2014/0308661 A1 | 10/2014 | Holmes et al. |
| 2014/0315104 A1 | 10/2014 | Liu et al. |
| 2014/0335415 A1 | 11/2014 | Tamaki et al. |
| 2014/0335918 A1 | 11/2014 | Gardner et al. |
| 2014/0363746 A1 | 12/2014 | He et al. |
| 2014/0370186 A1 | 12/2014 | Liang et al. |
| 2014/0370388 A1 | 12/2014 | Singh et al. |
| 2014/0377660 A1 | 12/2014 | Fukui et al. |
| 2015/0004486 A1 | 1/2015 | Moroishi et al. |
| 2015/0030929 A1 | 1/2015 | Barker |
| 2015/0037676 A1 | 2/2015 | Yamauchi et al. |
| 2015/0044556 A1 | 2/2015 | Wang et al. |
| 2015/0056677 A1 | 2/2015 | Abin et al. |
| 2015/0069449 A1 | 3/2015 | Nishido |
| 2015/0086471 A1 | 3/2015 | Sanchez Valente et al. |
| 2015/0086874 A1 | 3/2015 | Kondo et al. |
| 2015/0111105 A1 | 4/2015 | Kato et al. |
| 2015/0112109 A1 | 4/2015 | Sanchez Valente et al. |
| 2015/0125945 A1 | 5/2015 | Holmes et al. |
| 2015/0132650 A1 | 5/2015 | Mizuno et al. |
| 2015/0132660 A1 | 5/2015 | Ravet et al. |
| 2015/0140476 A1 | 5/2015 | Nair et al. |
| 2015/0155548 A1 | 6/2015 | Ryoshi et al. |
| 2015/0214273 A1 | 7/2015 | Seo et al. |
| 2015/0214506 A1 | 7/2015 | Seo et al. |
| 2015/0221703 A1 | 8/2015 | Seo et al. |
| 2015/0228977 A1 | 8/2015 | Toya et al. |
| 2015/0236342 A1 | 8/2015 | Rojeski |
| 2015/0236349 A1 | 8/2015 | Chiang et al. |
| 2015/0245456 A1 | 8/2015 | Nishino et al. |
| 2015/0263382 A1 | 9/2015 | Singh et al. |
| 2015/0280259 A1 | 10/2015 | Anderson et al. |
| 2015/0303474 A1 | 10/2015 | Barker et al. |
| 2015/0311506 A1 | 10/2015 | Mizuno et al. |
| 2015/0311520 A1 | 10/2015 | Mizuno et al. |
| 2015/0311565 A1 | 10/2015 | Muldoon et al. |
| 2015/0318335 A1 | 11/2015 | Kataishi et al. |
| 2015/0338428 A1 | 11/2015 | Holmes et al. |
| 2015/0357653 A1 | 12/2015 | Yoshida et al. |
| 2015/0364753 A1 | 12/2015 | Chiang et al. |
| 2015/0364761 A1 | 12/2015 | Fukui et al. |
| 2015/0368717 A1 | 12/2015 | Holmes et al. |
| 2015/0376817 A1 | 12/2015 | Xu et al. |
| 2016/0003823 A1 | 1/2016 | Holmes |
| 2016/0006028 A1 | 1/2016 | Nair et al. |
| 2016/0006090 A1 | 1/2016 | Licht |
| 2016/0007432 A1 | 1/2016 | Ohta et al. |
| 2016/0011215 A1 | 1/2016 | Holmes |
| 2016/0011225 A1 | 1/2016 | Holmes |
| 2016/0025760 A1 | 1/2016 | Holmes |
| 2016/0025763 A1 | 1/2016 | Holmes |
| 2016/0028105 A1 | 1/2016 | Khalifah et al. |
| 2016/0028114 A1 | 1/2016 | Pratt et al. |
| 2016/0032361 A1 | 2/2016 | Holmes et al. |
| 2016/0033544 A1 | 2/2016 | Holmes et al. |
| 2016/0043146 A1 | 2/2016 | Uesaka et al. |
| 2016/0054343 A1 | 2/2016 | Holmes et al. |
| 2016/0069919 A1 | 3/2016 | Holmes et al. |
| 2016/0069920 A1 | 3/2016 | Holmes et al. |
| 2016/0069921 A1 | 3/2016 | Holmes et al. |
| 2016/0077015 A1 | 3/2016 | Holmes et al. |
| 2016/0079608 A1 | 3/2016 | Choi et al. |
| 2016/0079609 A1 | 3/2016 | Choi et al. |
| 2016/0084863 A1 | 3/2016 | Holmes et al. |
| 2016/0087262 A1 | 3/2016 | Toya et al. |
| 2016/0093885 A1 | 3/2016 | Kamata et al. |
| 2016/0096334 A1 | 4/2016 | Sander et al. |
| 2016/0099480 A1 | 4/2016 | Nie et al. |
| 2016/0103123 A1 | 4/2016 | Holmes et al. |
| 2016/0111720 A1 | 4/2016 | Arthur et al. |
| 2016/0124009 A1 | 5/2016 | Wasson et al. |
| 2016/0155993 A1 | 6/2016 | Nishido et al. |
| 2016/0156019 A1 | 6/2016 | Kang et al. |
| 2016/0164093 A1 | 6/2016 | Inoue et al. |
| 2016/0164152 A1 | 6/2016 | Tan et al. |
| 2016/0168086 A1 | 6/2016 | Gonzalez Martinez et al. |
| 2016/0169880 A1 | 6/2016 | Holmes et al. |
| 2016/0169923 A1 | 6/2016 | Holmes et al. |
| 2016/0202588 A1 | 7/2016 | Bass et al. |
| 2016/0204436 A1 | 7/2016 | Barker et al. |
| 2016/0216286 A1 | 7/2016 | Holmes et al. |
| 2016/0216287 A1 | 7/2016 | Holmes et al. |
| 2016/0233437 A1 | 8/2016 | Suzuki et al. |
| 2016/0246153 A1 | 8/2016 | Garcia et al. |
| 2016/0268605 A1 | 9/2016 | Yamauchi et al. |
| 2016/0276707 A1 | 9/2016 | Holub et al. |
| 2016/0285086 A1 | 9/2016 | Zhu et al. |
| 2016/0320381 A1 | 11/2016 | Holmes et al. |
| 2016/0322589 A1 | 11/2016 | Watabe et al. |
| 2016/0343949 A1 | 11/2016 | Seo et al. |
| 2016/0343954 A1 | 11/2016 | Seo et al. |
| 2016/0351904 A1 | 12/2016 | Goodenough et al. |
| 2016/0358716 A1 | 12/2016 | Gardner et al. |
| 2016/0365577 A1* | 12/2016 | Zhang ............... H01M 10/0568 |
| 2016/0370396 A1 | 12/2016 | Wasson et al. |
| 2016/0372688 A1 | 12/2016 | Seo et al. |
| 2016/0377640 A1 | 12/2016 | Balwani et al. |
| 2016/0380236 A1 | 12/2016 | Seo et al. |
| 2017/0005327 A1 | 1/2017 | Goodenough et al. |
| 2017/0005332 A1 | 1/2017 | Chen et al. |
| 2017/0012207 A1 | 1/2017 | Seo et al. |
| 2017/0012232 A1 | 1/2017 | Kataishi et al. |
| 2017/0025479 A1 | 1/2017 | Seo et al. |
| 2017/0025615 A1 | 1/2017 | Seo et al. |
| 2017/0025630 A1 | 1/2017 | Seo et al. |
| 2017/0038401 A1 | 2/2017 | Holmes et al. |
| 2017/0040553 A1 | 2/2017 | Watabe et al. |
| 2017/0062869 A1 | 3/2017 | Zhamu et al. |
| 2017/0069852 A1 | 3/2017 | Kanamoto et al. |
| 2017/0084670 A1 | 3/2017 | Seo et al. |
| 2017/0092889 A1 | 3/2017 | Seo et al. |
| 2017/0092890 A1 | 3/2017 | Seo et al. |
| 2017/0098856 A1 | 4/2017 | Zhamu et al. |
| 2017/0104204 A1 | 4/2017 | Zhamu et al. |
| 2017/0104208 A1 | 4/2017 | Yamauchi et al. |
| 2017/0117524 A1 | 4/2017 | Chen et al. |
| 2017/0125703 A1 | 5/2017 | Suzuki et al. |
| 2017/0146882 A1 | 5/2017 | Bass et al. |
| 2017/0179527 A1 | 6/2017 | Schmitz et al. |
| 2017/0179558 A1 | 6/2017 | McKone et al. |
| 2017/0186971 A1 | 6/2017 | Kanamoto et al. |
| 2017/0186980 A1 | 6/2017 | Watabe et al. |
| 2017/0213876 A1 | 7/2017 | Ohsawa et al. |
| 2017/0213991 A1 | 7/2017 | Uesaka et al. |
| 2017/0222172 A1 | 8/2017 | Watabe et al. |
| 2017/0237118 A1 | 8/2017 | Khalifah et al. |
| 2017/0244059 A1 | 8/2017 | Sasaki et al. |
| 2017/0256795 A1 | 9/2017 | Semenenko et al. |
| 2017/0271610 A1 | 9/2017 | Takahashi |
| 2017/0283845 A1 | 10/2017 | Holmes et al. |
| 2017/0309687 A1 | 10/2017 | Watabe et al. |
| 2017/0309852 A1 | 10/2017 | Seo et al. |
| 2017/0312746 A1 | 11/2017 | Holmes et al. |
| 2017/0324054 A1 | 11/2017 | Ishisone et al. |
| 2017/0324055 A1 | 11/2017 | Ishisone et al. |
| 2017/0324081 A1 | 11/2017 | Toya et al. |
| 2017/0338436 A1 | 11/2017 | Mitsumori et al. |
| 2017/0338472 A1 | 11/2017 | Zhamu et al. |
| 2017/0338485 A1 | 11/2017 | Toya et al. |
| 2017/0350878 A1 | 12/2017 | Holmes et al. |
| 2017/0352868 A1 | 12/2017 | Zhamu et al. |
| 2017/0352869 A1 | 12/2017 | Zhamu et al. |
| 2017/0352891 A1 | 12/2017 | Choi et al. |
| 2017/0354955 A1 | 12/2017 | Hossain et al. |
| 2017/0373310 A1 | 12/2017 | Whittingham et al. |
| 2018/0034090 A1 | 2/2018 | Chiang et al. |
| 2018/0040877 A1 | 2/2018 | Ravet et al. |
| 2018/0045745 A1 | 2/2018 | Holmes et al. |

(56) References Cited

U.S. PATENT DOCUMENTS

| | | |
|---|---|---|
| 2018/0053933 A1 | 2/2018 | Ryoshi et al. |
| 2018/0062214 A1 | 3/2018 | Smith et al. |
| 2018/0115014 A1 | 4/2018 | Zanotti et al. |
| 2018/0131040 A1 | 5/2018 | Visco et al. |
| 2018/0145326 A1 | 5/2018 | Kensaku et al. |
| 2018/0154338 A1 | 6/2018 | Hossain et al. |
| 2018/0159123 A1 | 6/2018 | Mizuno et al. |
| 2018/0169421 A1 | 6/2018 | Chen et al. |
| 2018/0175433 A1 | 6/2018 | Zhamu et al. |
| 2018/0175434 A1 | 6/2018 | Zhamu et al. |
| 2018/0183062 A1 | 6/2018 | Zhamu et al. |
| 2018/0183066 A1 | 6/2018 | Zhamu et al. |
| 2018/0183089 A1 | 6/2018 | Xu et al. |
| 2018/0183107 A1 | 6/2018 | Zhamu et al. |
| 2018/0190983 A1 | 7/2018 | Fukui et al. |
| 2018/0205068 A1 | 7/2018 | Takeuchi et al. |
| 2018/0205080 A1 | 7/2018 | Toya et al. |
| 2018/0212241 A1 | 7/2018 | Liu et al. |
| 2018/0219048 A1 | 8/2018 | Seo et al. |
| 2018/0241080 A1 | 8/2018 | Jena et al. |
| 2018/0248185 A1 | 8/2018 | Johnson et al. |
| 2018/0248189 A1 | 8/2018 | Pan et al. |
| 2018/0248190 A1 | 8/2018 | Pan et al. |
| 2018/0254481 A2 | 9/2018 | Kamata et al. |
| 2018/0277894 A1 | 9/2018 | Pan et al. |
| 2018/0277913 A1 | 9/2018 | Pan et al. |
| 2018/0287150 A1 | 10/2018 | Goodenough et al. |
| 2018/0294474 A1 | 10/2018 | Zhamu et al. |
| 2018/0294476 A1 | 10/2018 | Zhamu et al. |
| 2018/0301707 A1 | 10/2018 | Pan et al. |
| 2018/0307113 A1 | 10/2018 | Bass et al. |
| 2018/0323474 A1 | 11/2018 | Liu et al. |
| 2018/0342731 A1 | 11/2018 | Ravet et al. |
| 2018/0342733 A1 | 11/2018 | Goodenough et al. |
| 2018/0342737 A1 | 11/2018 | Zhamu et al. |
| 2018/0347069 A1 | 12/2018 | Toya et al. |
| 2018/0351200 A1 | 12/2018 | Zhamu et al. |
| 2018/0351201 A1 | 12/2018 | Zhamu et al. |
| 2018/0375156 A1 | 12/2018 | Zhamu et al. |
| 2019/0006671 A1 | 1/2019 | Uekusa et al. |
| 2019/0020025 A1 | 1/2019 | Matsumoto et al. |
| 2019/0027542 A1 | 1/2019 | Watabe et al. |
| 2019/0027788 A1 | 1/2019 | Liu et al. |
| 2019/0044137 A1 | 2/2019 | Zhamu et al. |
| 2019/0051905 A1 | 2/2019 | Zhamu et al. |
| 2019/0067732 A1 | 2/2019 | Zhamu et al. |
| 2019/0071319 A1 | 3/2019 | Rodriguez et al. |
| 2019/0088882 A1 | 3/2019 | Seo et al. |
| 2019/0097210 A1 | 3/2019 | Chen et al. |
| 2019/0115591 A1 | 4/2019 | Zhamu et al. |
| 2019/0148715 A1 | 5/2019 | Liu et al. |
| 2019/0165365 A1 | 5/2019 | Zhamu et al. |
| 2019/0165374 A1 | 5/2019 | Zhamu et al. |
| 2019/0173079 A1 | 6/2019 | Zhamu et al. |
| 2019/0173082 A1 | 6/2019 | Zhamu et al. |
| 2019/0180951 A1 | 6/2019 | Yokota et al. |
| 2019/0189936 A1 | 6/2019 | Watabe et al. |
| 2019/0190022 A1 | 6/2019 | Kim et al. |
| 2019/0207124 A1 | 7/2019 | Kanamoto et al. |
| 2019/0207200 A1 | 7/2019 | Zhamu et al. |
| 2019/0259583 A1 | 8/2019 | Baba et al. |
| 2019/0273257 A1 | 9/2019 | Siu et al. |
| 2019/0305290 A1 | 10/2019 | Singh et al. |
| 2019/0312272 A1 | 10/2019 | Goodenough et al. |
| 2019/0341652 A1 | 11/2019 | Laughman et al. |
| 2019/0348625 A1 | 11/2019 | Mitsumori et al. |
| 2019/0355963 A1 | 11/2019 | Singh et al. |
| 2019/0363394 A1 | 11/2019 | Zhamu et al. |
| 2019/0372093 A1 | 12/2019 | Zhamu et al. |
| 2019/0372099 A1 | 12/2019 | Zhamu et al. |
| 2019/0372100 A1 | 12/2019 | Zhamu et al. |
| 2019/0372148 A1 | 12/2019 | He et al. |
| 2019/0372151 A1 | 12/2019 | Zhamu et al. |
| 2019/0372174 A1 | 12/2019 | He et al. |
| 2019/0372449 A1 | 12/2019 | Mills |
| 2019/0379021 A1 | 12/2019 | He et al. |
| 2019/0379039 A1 | 12/2019 | Zhamu et al. |
| 2019/0379045 A1 | 12/2019 | He et al. |
| 2019/0393467 A1 | 12/2019 | Guo et al. |
| 2019/0393482 A1 | 12/2019 | He et al. |
| 2019/0393485 A1 | 12/2019 | He et al. |
| 2019/0393486 A1 | 12/2019 | He et al. |
| 2019/0393487 A1 | 12/2019 | He et al. |
| 2019/0393495 A1 | 12/2019 | He et al. |
| 2019/0393496 A1 | 12/2019 | He et al. |
| 2019/0393508 A1 | 12/2019 | Zhamu et al. |
| 2019/0393541 A1 | 12/2019 | Jang |
| 2019/0393542 A1 | 12/2019 | Jang |
| 2019/0393543 A1 | 12/2019 | Zhamu et al. |
| 2020/0006770 A1 | 1/2020 | Kamata et al. |
| 2020/0014057 A1 | 1/2020 | Xu et al. |
| 2020/0020895 A1 | 1/2020 | Collins et al. |
| 2020/0028147 A1 | 1/2020 | Zhamu et al. |
| 2020/0028158 A1 | 1/2020 | Zhamu et al. |
| 2020/0028205 A1 | 1/2020 | Zhamu et al. |
| 2020/0044250 A1 | 2/2020 | Toya et al. |
| 2020/0052042 A1 | 2/2020 | Seo et al. |
| 2020/0052325 A1 | 2/2020 | Zhamu et al. |
| 2020/0052350 A1 | 2/2020 | Zhamu et al. |
| 2020/0057085 A1 | 2/2020 | Wasson et al. |
| 2020/0058936 A1 | 2/2020 | Horikawa et al. |
| 2020/0067077 A1 | 2/2020 | Pan et al. |
| 2020/0067079 A1 | 2/2020 | Pan et al. |
| 2020/0067080 A1 | 2/2020 | Pan et al. |
| 2020/0067101 A1 | 2/2020 | Pan et al. |
| 2020/0083543 A1 | 3/2020 | Choi et al. |
| 2020/0091507 A1 | 3/2020 | Zhamu et al. |
| 2020/0098997 A1 | 3/2020 | Watabe et al. |
| 2020/0144595 A1 | 5/2020 | Lin |
| 2020/0144600 A1 | 5/2020 | Zhong et al. |
| 2020/0144605 A1 | 5/2020 | Su et al. |
| 2020/0153068 A1 | 5/2020 | Licht |
| 2020/0207881 A1 | 7/2020 | Ohkimoto et al. |
| 2020/0230596 A1 | 7/2020 | Holmes et al. |
| 2020/0235421 A1 | 7/2020 | Zhou et al. |
| 2020/0243838 A1 | 7/2020 | Jang |
| 2020/0243854 A1 | 7/2020 | Jang |
| 2020/0253047 A1 | 8/2020 | Lai et al. |
| 2020/0259105 A1 | 8/2020 | Watabe et al. |
| 2020/0259200 A1 | 8/2020 | Nie et al. |
| 2020/0266426 A1 | 8/2020 | Zhamu et al. |
| 2020/0280012 A1 | 9/2020 | Mitsumori et al. |
| 2020/0280054 A1 | 9/2020 | Jang |
| 2020/0280055 A1 | 9/2020 | Jang |
| 2020/0287206 A1 | 9/2020 | Jang |
| 2020/0287207 A1 | 9/2020 | Jang |
| 2020/0295267 A1 | 9/2020 | Kanamoto et al. |
| 2020/0295355 A1 | 9/2020 | Kanno et al. |
| 2020/0295399 A1 | 9/2020 | Zhou et al. |
| 2020/0313174 A1 | 10/2020 | Wang et al. |
| 2020/0321614 A1 | 10/2020 | Banerjee et al. |
| 2020/0326356 A1 | 10/2020 | Wasson et al. |
| 2020/0350373 A1 | 11/2020 | Ohsawa et al. |
| 2020/0350503 A1 | 11/2020 | Seo et al. |
| 2020/0350508 A1 | 11/2020 | Seo et al. |
| 2020/0350589 A1 | 11/2020 | Jang |
| 2020/0354220 A1 | 11/2020 | Pedersen et al. |
| 2020/0358090 A1 | 11/2020 | Jang |
| 2020/0358141 A1 | 11/2020 | Jang |
| 2020/0365902 A1 | 11/2020 | Jang |
| 2020/0366180 A1 | 11/2020 | Mills |
| 2020/0381728 A1 | 12/2020 | Uekusa et al. |
| 2020/0395566 A1 | 12/2020 | Ishisone et al. |
| 2020/0403555 A1 | 12/2020 | Mills |
| 2021/0021001 A1 | 1/2021 | Chang et al. |
| 2021/0021003 A1 | 1/2021 | Chen et al. |
| 2021/0028451 A1 | 1/2021 | Johnson et al. |
| 2021/0028507 A1 | 1/2021 | Su et al. |

(56) References Cited

U.S. PATENT DOCUMENTS

2021/0028509 A1 1/2021 Su et al.
2021/0043929 A1 2/2021 Huang et al.

OTHER PUBLICATIONS

Zima, Vítězslav, et al. "Ion-exchange properties of alkali-metal redox-intercalated vanadyl phosphate." Journal of Solid State Chemistry 163.1 (2002): 281-285.
Lii, Kwang-Hwa, and Wei-Chuan Liu. "RbVOPO4 and CsVOPO4, Two Vanadyl (IV) Orthophosphates with an Intersecting Tunnel Structure and Discrete VO5 Pyramids." Journal of Solid State Chemistry 103.1 (1993): 38-44.
Yakubovich, O. V., O. V. Karimova, and O. K. Mel'nikov. "The mixed anionic framework in the structure of Na2{MnF [PO4]}." Acta Crystallographica Section C: Crystal Structure Communications 53.4 (1997): 395-397.
Schindler, M., F. C. Hawthorne, and W. H. Baur. "Crystal chemical aspects of vanadium: polyhedral geometries, characteristic bond valences, and polymerization of (VO n) polyhedra." Chemistry of Materials 12.5 (2000): 1248-1259.
Panin, Rodion V., et al. "Crystal Structure, Polymorphism, and Properties of the New Vanadyl Phosphate Na4VO (PO4)2." Chemistry of materials 16.6 (2004): 1048-1055.
Belkhiri, Sabrina, Djillali Mezaoui, and Thierry Roisnel. "The Structure Determination of a New Mixed Mono-Arsenate K2V2O2 (AsO4)2." 3ème Conférence Internationale sur le Soudage, le CND et l'Industrie des Matériaux et Alliages (IC-WNDT-MI' 12). Centre de Recherche Scientifique et Technique en Soudage et Contrôle (CSC), 2012.
Glasser, Leslie, and C. Richard A. Catlow. "Modelling phase changes in the potassium titanyl phosphate system." Journal of Materials Chemistry 7.12 (1997): 2537-2542.
Fedotov, Stanislav S., et al. "AVPO4F (A= Li, K): A 4 V Cathode Material for High-Power Rechargeable Batteries." Chemistry of Materials 28.2 (2016): 411-415.
Belkhiri, Sabrina, Djillali Mezaoui, and Thierry Roisnel. "K2V2O2 (AsO4)2." Acta Crystallographica Section E: Structure Reports Online 68.7 (2012): i54-i54.
Yakubovich, O. V., V. V. Kireev, and O. K. Mel'nikov. "Refinement of crystal structure of a Ge-analogue of natisite Na2 {TiGeO4} and prediction of new phases with anionic {MTO5} radicals." Crystallography Reports 45.4 (2000): 578-584.
Boudin, S., et al. "Review on vanadium phosphates with mono and divalent metallic cations: syntheses, structural relationships and classification, properties." International Journal of Inorganic Materials 2.6 (2000): 561-579.
Kerr, T. A., J. Gaubicher, and L. F. Nazar. "Highly Reversible Li Insertion at 4 V in ε-VOPO4/α-LiVOPO4 Cathodes." Electrochemical and Solid-State Letters 3, No. 10 (2000): 460-462.
Quackenbush, Nicholas F., Linda Wangoh, Bohua Wen, Ruibo Zhang, Youngmin Chung, Natasha Chernova, Zehua Chen et al. "Interfacial Effects of Electrochemical Lithiation of Epsilon-VOPO4 and Evolution of the Electronic Structure." In Meeting Abstracts, No. 6, pp. 491-491. The Electrochemical Society, 2015.
Whittingham, M. Stanley. "Lithium batteries and cathode materials." Chemical reviews 104, No. 10 (2004): 4271-4302.
Winter, Martin, and Ralph J. Brodd. "What are batteries, fuel cells, and supercapacitors?." Chemical reviews 104, No. 10 (2004): 4245-4270.

Melot, Brent C., and J-M. Tarascon. "Design and preparation of materials for advanced electrochemical storage." Accounts of chemical research 46, No. 5 (2013): 1226-1238.
Whittingham, M. Stanley. "Ultimate limits to intercalation reactions for lithium batteries." Chemical reviews 114, No. 23 (2014): 11414-11443.
Zaghib, K., A. Mauger, F. Gendron, and C. M. Julien. "Surface effects on the physical and electrochemical properties of thin LiFePO4 particles." Chemistry of Materials 20, No. 2 (2008): 462-469.
Liu, Hao, Fiona C. Strobridge, Olaf J. Borkiewicz, Kamila M. Wiaderek, Karena W. Chapman, Peter J. Chupas, and Clare P. Grey. "Capturing metastable structures during high-rate cycling of LiFePO4 nanoparticle electrodes." Science 344, No. 6191 (2014).
Hautier, Geoffroy, Anubhav Jain, Shyue Ping Ong, Byoungwoo Kang, Charles Moore, Robert Doe, and Gerbrand Ceder. "Phosphates as lithium-ion battery cathodes: an evaluation based on high-throughput ab initio calculations." Chemistry of Materials 23, No. 15 (2011): 3495-3508.
Siu, Carrie, Ieuan D. Seymour, Sylvia Britto, Hanlei Zhang, Jatinkumar Rana, Jun Feng, Fredrick O. Omenya et al. "Enabling multi-electron reaction of ε-VOPO 4 to reach theoretical capacity for lithium-ion batteries." Chemical communications 54, No. 56 (2018): 7802-7805.
Lim S. C., J. T. Vaughey, W. T. A. Harrison, L. L. Dussack, A. J. Jacobson, and J. W. Johnson. "Redox transformations of simple vanadium phosphates: the synthesis of ε-VOPO4." Solid State Ionics 84, No. 3-4 (1996): 219-226.
Kerr, T. A., J. Gaubicher, and L. F. Nazar. "Highly Reversible Li Insertion at 4 V in ε-VOPO 4/α-LiVOPO4 Cathodes." Electrochemical and Solid State Letters 3, No. 10 (2000): 460.
Song, Yanning, Peter Y. Zavalij, and M. Stanley Whittingham. "ε-VOPO4: electrochemical synthesis and enhanced cathode behavior." Journal of the Electrochemical Society 152, No. 4 (2005): A721.
Lin, Yuh-Chieh, Bohua Wen, Kamila M. Wiaderek, Shawn Sallis, Hao Liu, Saul H. Lapidus, Olaf J. Borkiewicz et al. "Thermodynamics, kinetics and structural evolution of ε-LiVOPO4 over multiple lithium intercalation." Chemistry of Materials 28, No. 6 (2016): 1794-1805.
Chen, Zehua, Qiyuan Chen, Liquan Chen, Ruibo Zhang, Hui Zhou, Natasha A. Chernova, and M. Stanley Whittingham. "Electrochemical Behavior of Nanostructured ε-VOPO4 over Two Redox Plateaus." Journal of The Electrochemical Society 160, No. 10 (2013): A1777.
Azmi, Bustam M., Hasanaly S. Munirah, Tatsumi Ishihara, and Yusaku Takita. "Optimized LiVOPO 4 for cathodes in Li-ion rechargeable batteries." Ionics 11, No. 5-6 (2005): 402-405.
Bianchini, Mateos, J. M. Ateba-Mba, Philippe Dagault, Elena Bogdan, D. Carlier, Emmanuelle Suard, Christian Masquelier, and Laurence Croguennec. "Multiple phases in the ε-VPO 4 O-LiVPO 4 O-Li 2 VPO 4 O system: a combined solid state electrochemistry and diffraction structural study." Journal of Materials Chemistry A 2, No. 26 (2014): 10182-10192.
Harrison, Katharine L., Craig A. Bridges, Carlo U. Segre, C. Daniel Varnado Jr, Danielle Applestone, Christopher W. Bielawski, Mariappan Parans Paranthaman, and Arumugam Manthiram. "Chemical and electrochemical lithiation of LiVOPO4 cathodes for lithium-ion batteries." Chemistry of Materials 26, No. 12 (2014): 3849-3861.

\* cited by examiner

Morphological and structure characterization of ε-VOPO₄.
SEM image

XRD pattern with Rietveld refinement of the as synthesized ε-VOPO₄.

TEM images of ε-VOPO₄ hand ground with graphene nanoplatelets for electrode preparation Galvanostatic charge-discharge curves of ε-VOPO$_4$ from 1.6 to 4.5V cycle performance at C/50, 1C=2 Li CV curve profile of ε-VOPO$_4$ at a scan rate of 0.02mV/s

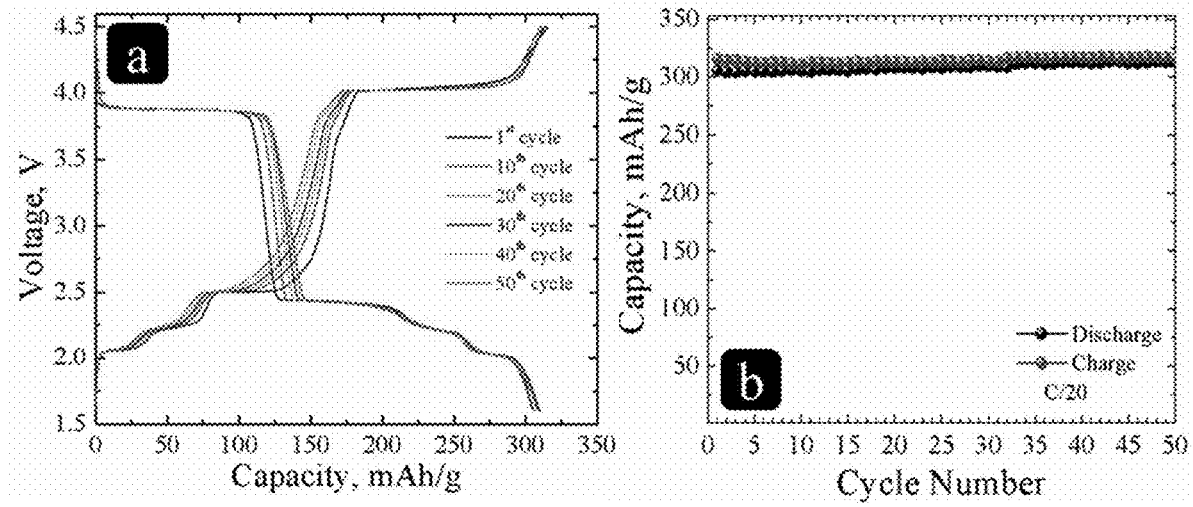
Figure 5A
Galvanostatic charge-discharge curves of ε-VOPO$_4$ from 1.6 to 4.5V
Figure 5B
Cycle performance at C/20, 1C=2Li
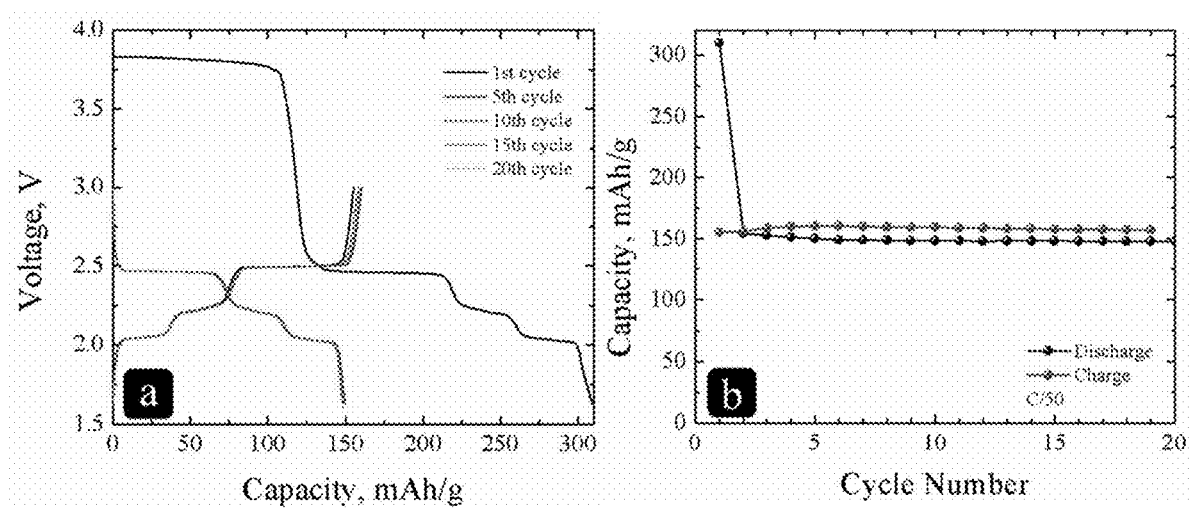
Figure 6A
Galvanostatic charge-discharge curves of ε-VOPO$_4$ at the low voltage region, from 1.6 to 3.0 V
Figure 6B
Cycle performance at C/50, 1C=2Li Cycling curves of ε-VOPO$_4$ in the low voltage region, from 1.6 - 3.0 V, at different rate Cycle performance Galvanostatic charge-discharge curves of ε-VOPO$_4$ at the high voltage region, from 3.0 to 4.5V Cycle performance at C/50, 1C=2Li Cycle curves of ε-VOPO$_4$ at high voltage region, from 3.0 to 4.5 V, at different current rates Cycle performance

ε-VOPO₄ CATHODE FOR LITHIUM ION BATTERIES

CROSS REFERENCE TO RELATED APPLICATIONS

The present invention is a Non-Provisional of and claims benefit of priority from, U.S. Patent Application No. 62/638,893, filed Mar. 5, 2018, the entirety of which is expressly incorporated herein by reference.

STATEMENT OF FEDERALLY FUNDED RESEARCH

This invention was made with government support under contract DE-SC0012583 awarded by the Department of Energy. The government has certain rights in the invention.

FIELD OF THE INVENTION

The present invention relates to the field of electrode materials for batteries, and more particularly to an ε-vanadyl phosphate cathode having near theoretical dual lithium ion capacity.

BACKGROUND OF THE INVENTION

Energy conversion and storage have become more and more important in transportation, commercial, industrial, residential, and consumer applications. In particular, large-scale implementation of renewable energy, increasing ubiquity of portable electronics, and the next generation of electric vehicles require inexpensive and efficient energy storage systems.

A lithium secondary battery includes a cathode, an anode, and a separator. The separator may be a solid electrolyte, or an additional element with a liquid electrolyte. During discharging of the lithium secondary battery, oxidation reaction occurs in the anode due to deintercalation of lithium ions, while reduction reaction occurs in the cathode due to intercalation of lithium ions. The vice versa processes take place during the battery charging. The electrolyte has selective conductivity only ions, and thus transfers lithium ions between the cathode and the anode. Lithium ions intercalated into an electrode of a battery lead to charge neutrality with electrons entered into the electrode, and thus serve as media storing electric energy in the electrode. Accordingly, the quantity of electric energy storable by the battery is dependent upon the quantity of lithium ions intercalated into the electrode. Although basic performance of the lithium secondary battery, such as operating voltage and energy density, is dependent upon the materials of the cathode and anode, the electrolyte also needs to have high-ion conductivity, electrochemical stability and thermal stability to ensure high performance of the lithium secondary battery.

A typical lithium ion battery electrolyte consists of a lithium salt and a solvent. Because of the high operating voltage, the solvent is typically anhydrous, with organic solvents now common, e.g., glyme. Phosphazenes and phosphoranimines have been proposed as an alternate non-flammable electrolyte. Other nitrogen, sulfur, phosphorus, silicon, compounds are also known as electrolyte additives or electrolytes. The electrolyte needs to be electrochemically stable in a voltage range where reduction and oxidation proceed in the anode and cathode, respectively.

As the use of lithium secondary batteries is expanding to electric vehicles and power storage fields, electrode active materials for use at high voltages emerged and became available. Use of a relatively low-potential anode active material and a relatively high-potential cathode active material has led to a narrower potential window of the electrolyte, so that the electrolyte is more likely to decompose on a surface of the cathode/anode. Lithium secondary batteries for electric vehicles and power storage are likely to be exposed to external high-temperature environment conditions, and the temperatures of these lithium secondary batteries may rise during instantaneous charging and discharging. Accordingly, lifetime and stored energy quantity of the lithium secondary battery may be reduced in such high-temperature environment conditions.

Typical lithium secondary battery technologies are discussed in U.S. Pat. No. 9,819,054, expressly incorporated herein by reference it its entirety.

The non-aqueous solvent, which is in the electrolyte of a lithium secondary battery according to the above-described embodiments, may serve as a migration medium of ions involved in electrochemical reactions of the battery. Any suitable non-aqueous solvent that is commonly used in the art may be used. For example, the non-aqueous solvent may be an organic carbonate compound, an ester compound, an ether compound, a ketone compound, an alcohol compound, an aprotic bipolar solvent, or a combination thereof. The carbonate compound may be an open chain carbonate compound, a cyclic carbonate compound, a fluoro carbonate derivative thereof, or a combination thereof.

The electrolyte useful for the battery is one which does not chemically react with the anode or with the cathode during storage, and permits the migration of ions to intercalate the cathode-active material and vice-versa (during the discharge and charging cycles, respectively). The electrolyte may be present in a pure state (in the form of a solid, fused solid or liquid) or it may be conveniently dissolved in a suitable solvent. As a general rule, the electrolyte material should consist of a compound of the same species as that which is selected for the anode-active material. Thus, useful electrolytes may be conveniently represented by the general formula LY wherein L is a cationic moiety selected from the same materials useful as the anode-active material and Y is an anionic moiety or moieties such as halides, sulfates, nitrates, beta-aluminas, phosphofluorides, perchlorates and rubidium halide. The electrolyte may be present in a pure state in the form of a solid, fused solid (i.e. molten salt) or liquid or it may be conveniently dissolved in a suitable solvent which does not generally hydrolyze or degrade under conditions within the battery. Such electrolytes include ketones, esters, ethers, organic carbonates (such as propylene carbonate), organic lactones, organic nitriles, nitrohydrocarbons, organic sulfoxides, etc. and mixtures thereof. Where the solvent is utilized, the electrolyte salt may be present in a concentration determined by the desired solution conductivity, solubility and chemical reactivity. The electrolyte may include additives to reduce flammability, such as phosphazenes, e.g., cyclic phosphazenes.

Non-limiting examples of the chain carbonate compound are diethyl carbonate ("DEC"), dimethyl carbonate, ("DMC"), dipropyl carbonate ("DPC"), methylpropyl carbonate ("MPC"), ethylpropylcarbonate ("EPC"), methylethyl carbonate ("MEC"), and a combination thereof. Non-limiting examples of the cyclic carbonate compound are ethylene carbonate ("EC"), propylenecarbonate ("PC"), butylene carbonate ("BC"), fluoroethylene carbonate ("FEC"), vinylethylene carbonate ("VEC"), and a combination thereof. Non-limiting examples of the fluorocarbonate compound are fluoroethylene carbonate ("FEC"), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylene carbonate, trifluoromethylethylene carbonate, and a combination thereof. The carbonate compound may include a combination of cyclic carbonate and chain carbonate, in consideration of dielectric constant and viscosity of the electrolyte. For example, an amount of a cyclic carbonate compound may be at least 10% by volume based on a total volume of the non-aqueous organic solvent. The carbonate compound may be a mixture of such chain carbonate and/or cyclic carbonate compounds as described above with a fluorocarbonate compound. The fluorocarbonate compound may increase solubility of a lithium salt to improve ionic conductivity of the electrolyte, and may facilitate formation of the thin film on the anode. In some embodiments, the fluorocarbonate compound may be fluoroethylene carbonate ("FEC"). An amount of the fluorocarbonate compound may be from about 1 to about 30 percent by volume ("volume %") based on a total volume of the non-aqueous organic solvent. When the amount of the fluorocarbonate compound is within this range, the electrolyte may have an appropriate viscosity to provide desired effects thereof.

Non-limiting examples of the ester compound are methyl acetate, ethyl acetate, n-propyl acetate, dimethyl acetate, methyl propionate ("MP"), ethyl propionate, γ-butyrolactone, decanolide, valerolactone, mevalonolactone, caprolactone, and methyl formate. Non-limiting examples of the ether compound are dibutyl ether, tetraglyme, diglyme, 1,2-dimethoxyethane, 1,2-diethoxyethane, ethoxymethoxyethane, 2-methyltetrahydrofuran, and tetrahydrofuran. An example of the ketone compound is cyclohexanone. Non-limiting examples of the alcohol compound are ethyl alcohol and isopropyl alcohol.

Examples of the aprotic solvent are nitriles (such as R—CN, wherein R is a $C_2$-$C_{20}$ linear, branched, or cyclic hydrocarbon-based moiety that may include a double-bond, an aromatic ring or an ether bond), amides (such as formamide and dimethylformamide), dioxolanes (such as 1,2-dioxolane and 1,3-dioxolane), methylsulfoxide, sulfolanes (such as sulfolane and methylsulfolane), 1,3-dimethyl-2-imidazolidinone, N-methyl-2-pyrrolidinone, nitromethane, trimethyl phosphate, triethyl phosphate, trioctyl phosphate, and triester phosphate.

The non-aqueous organic solvent may be used alone or in a combination of at least two solvents. In the latter case, a mixing ratio of the at least two non-aqueous organic solvents may be appropriately adjusted depending on a desired performance of the battery.

The non-aqueous organic solvent may further include an aromatic hydrocarbon organic solvent in the carbonate solvent. The carbonate solvent and the aromatic hydrocarbon organic solvent may be mixed, for example, in a volume ratio of about 1:1 to about 30:1. Examples of the aromatic hydrocarbon organic solvent are benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, 2-fluorotoluene, 3-fluorotoluene, 4-fluorotoluene, 2,3-difluorotoluene, 2,4-difluorotoluene, 2,5-difluorotoluene, 2,6-difluorotoluene, 3,4-difluorotoluene, 3,5-difluorotoluene, 2,3,4-trifluorotoluene, 2,3,5-trifluorotoluene, 2,3,6-trifluorotoluene, 3,4,5-trifluorotoluene, 2,4,5-trifluorotoluene, 2,4,6-trifluorotoluene, 2-chlorotoluene, 3-chlorotoluene, 4-chlorotoluene, 2,3-dichlorotoluene, 2,4-dichlorotoluene, 2,5-dichlorotoluene, 2,6-dichlorotoluene, 2,3,4-trichlorotoluene, 2,3,5-trichlorotoluene, 2,3,6-trichlorotoluene, 3,4,5-trichlorotoluene, 2,4,5-trichlorotoluene, 2,4,6-trichlorotoluene, 2-iodotoluene, 3-iodotoluene, 4-iodotoluene, 2,3-diiodotoluene, 2,4-diiodotoluene, 2,5-diiodotoluene, 2,6-diiodotoluene, 3,4-diiodotoluene, 3,5-diiodotoluene, 2,3,4-triiodotoluene, 2,3,5-triiodotoluene, 2,3,6-triiodotoluene, 3,4,5-triiodotoluene, 2,4,5-triiodotoluene, 2,4,6-triiodotoluene, o-xylene, m-xylene, p-xylene, and combinations thereof.

Suitable electrolyte salts include, for example, $LiPF_6$, $LiBF_4$, $LiClO_4$, LiTFSI. Suitable solvents may be any solvent which is stable within the electrochemical window of the cell and is inert to other components of the cell. Examples of suitable solvents include carbonate solvents such as ethylene carbonate, diethyl carbonate, and propylene carbonate, organic ethers such as dioxolane, dimethyl ether and tetrahydrofuran and organic nitriles such as acetonitrile. Additionally, the electrolyte may be a nonaqueous polymer electrolyte such as a gel polymer electrolyte, a solid ceramic electrolyte. In one embodiment, the electrolyte may include additives such as fluoroethylene carbonate (FEC) in order to, for example, improve cycling.

The lithium salt may be any suitable lithium salt that is commonly used for lithium batteries. Examples of the lithium salt for the non-aqueous electrolyte are $LiPF_6$, $LiBF_4$, $LiSbF_6$, $LiAsF_6$, $LiSbF_6$, $LiCF_3SO_3$, $Li(CF_3SO_2)_3C$, $Li(CF_3SO_2)_2N$, $LiC_4F_9SO_3$, $LiClO_4$, $LiAlO_2$, $LiAlCl_4$, $LiAlF_4$, $LiBPh_4$, $LiBioCl_{10}$, $CH_3SO_3Li$, $C_4F_3SO_3Li$, $(CF_3SO_2)_2NLi$, $LiN(C_xF_{2x+1}SO_2)(C_xF_{2y+1}SO_2)$ (wherein x and y are natural numbers), $CF_3CO_2Li$, LiCl, LiBr, LiI, LIBOB (lithium bisoxalato borate), lower aliphatic carboxylic acid lithium, lithium terphenylborate, lithium imide, and a combination thereof. These lithium salts may be used as a supporting electrolytic salt.

A concentration of the lithium salt may be within a range known to one of ordinary skill in the art. The concentration of the lithium salt is not specifically limited, and in some embodiments, may be in a range of about 0.1 molar ("M") to about 2.0 M in the electrolyte to improve practical performance of a lithium battery. When the concentration of the lithium salt is within this range, the electrolyte may have appropriate conductivity and appropriate viscosity for improved performance, and may improve mobility of lithium ions.

In some embodiments, the electrolyte for a lithium battery may further include an additive to facilitate the formation of a stable solid electrolyte interphase ("SEI") or a thin film on a surface of an electrode to provide improved cycle characteristics.

Non-limiting examples of the additive are tris(trimethylsilyl)phosphate ("TMSPa"), lithium difluoro oxalate borate ("LiFOB"), vinylene carbonate ("VC"), propane sulfone ("PS"), succinonitrile ("SN"), $LiBF_4$, a silane compound having a functional group able to form a siloxane bond (for example, acryl, amino, epoxy, methoxy, ethoxy, or vinyl), and a silazane compound such as hexamethyldisilazane. These additives may be used alone or in a combination of at least two thereof.

An amount of the additive may be from about 0.01 wt % to about 10 wt % based on a total weight of the non-aqueous organic solvent. For example, the amount of the additive may be from 0.05 wt % to about 10 wt %, in some embodiments, from about 0.1 wt % to about 5 wt %, and in some other embodiments, from about 0.5 wt % to about 4 wt %, based on the total weight of the non-aqueous organic solvent. However, the amount of the additive is not particularly limited unless the additive significantly hinders improvement in capacity retention rate of a lithium battery including the electrolyte. The lithium battery may be manufactured using a method known in the art.

According to the above-embodiments of the present disclosure, the lithium secondary battery may have a thin film formed on the surface of the cathode due to oxidation of at least a part of the additive in the electrolyte during initial charging of the lithium secondary battery. Thus, the lithium secondary battery may have improved capacity retention characteristics, lifetime characteristics and high-rate characteristics even when charged at a high operating voltage of about 4.0 V to about 5.5 V, for example, a voltage about 4.3 V to about 5.5 V. An additive in the electrolyte may enhance formation of a thin film on a surface of the cathode, the thin film having a thickness of, for example, about 0.05 nanometers ("nm") to about 100 nm. For example, the thin film may have a thickness of about 0.1 nm to about 80 nm, and in some embodiments, about 0.5 nm to about 50 nm. The thin film on the cathode surface may effectively prevent oxidation of the electrolyte on the cathode surface so that the conduction of lithium ions is not impeded.

FIG. 10 is an exploded perspective view of a lithium secondary battery 100 according to an embodiment. Although the lithium secondary battery 100 illustrated in FIG. 10 is cylindrical, embodiments of the present disclosure are not limited thereto, and lithium secondary batteries according to embodiments may be of a rectangular type or a pouch type. Lithium secondary batteries may be classified as lithium ion batteries, lithium ion polymer batteries, or lithium polymer batteries, according to the type of separator and/or electrolyte included therein. In addition, lithium batteries may be classified as cylindrical type, rectangular type, coin type, or pouch type, according to the shape thereof. Lithium batteries may also be classified as either bulk type or thin film type, according to the size thereof. Lithium secondary batteries according to embodiments may have any appropriate shape. The structure of a lithium secondary battery and a method of manufacturing the same are known in the art, so a detailed description thereof will not be recited here. Referring to FIG. 10, the lithium secondary battery 100, which is cylindrical, includes an anode 112, a cathode 114, a separator 113 disposed between the anode 112 and the cathode 114, and an electrolyte (not shown) impregnated into the anode 112, the cathode 114 and the separator 113, a battery case 120, and a sealing member 140 sealing the battery case 120. The lithium secondary battery 100 is manufactured by sequentially stacking the anode 112, the cathode 114, and the separator 113 upon one another to form a stack, rolling the stack in a spiral form, and accommodating the rolled up stack in the battery case 120. The cathode 114 includes a cathode current collector, and a cathode active material layer disposed on the cathode current collector. The cathode current collector may have a thickness of about 3 μm to about 500 μm. The cathode current collector is not particularly limited, and may be formed of any material so long as it has a suitable conductivity without causing chemical changes in the fabricated battery. Examples of the cathode current collector include copper, stainless steel, aluminum, nickel, titanium, sintered carbon, copper or stainless steel that is surface-treated with carbon, nickel, titanium or silver, and aluminum-cadmium alloys. In addition, the cathode current collector may be processed to have fine irregularities on surfaces thereof so as to enhance adhesive strength of the cathode current collector to the cathode active material, and may be used in any of various forms including films, sheets, foils, nets, porous structures, foams, and non-woven fabrics.

Known cathode active material layers include a cathode active material, a binder, and a conducting agent.

Known cathode active materials include lithium-containing metal oxides, e.g., at least one of a composite oxide of lithium with a metal selected from Co, Mn, Ni, and a combination thereof.

During initial cycling, a solid electrolyte interphase layer (SEI layer) forms in an electrolyte battery, representing insoluble breakdown products of the electrolyte in combination with other battery components, such as electrode material. The SEI layer serves to protect the electrolyte from further free radical reactions during overvoltage periods, e.g., during charging.

The compounds listed above as cathode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or any other method known to one of ordinary skill in the art.

The binder strongly binds positive cathode active material particles together and to a current collector. Examples of the binder are, but not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon.

Known electrodes include a conducting agent used to provide conductivity to electrodes. Any electron conducting material that does not induce chemical change in batteries may be used. Examples of the conducting agent include natural graphite, artificial graphite, carbon black, acetylene black, ketjen black, carbon fibers, and metallic materials, including copper, nickel, aluminum, and silver, in powder or fiber form. The conducting agent may include a single conductive material, such as a polyphenylene derivative, or a combination of at least two conductive materials.

The amounts of the cathode active material, the binder, and the conducting agent may be equivalent to those commonly used in lithium batteries. For example, a weight ratio of the cathode active material to a mixture of the conducting agent and the binder may be from about 98:2 to about 92:8, and in some embodiments from about 95:5 to about 90:10. A mixing ratio of the conducting agent to the binder may be, but not limited, from about 1:1.5 to about 1:3. The known cathode active materials may have, for example, an operating voltage range of about 4.0 V to ≥5.5 V.

An exemplary lithium secondary battery 100, shown in FIG. 10, is cylindrical, and includes an anode 112, a cathode 114, a separator 113 disposed between the anode 112 and the cathode 114, and an electrolyte (not shown) impregnated into the anode 112, the cathode 114 and the separator 113, a battery case 120, and a sealing member 140 sealing the battery case 120. The lithium secondary battery 100 is manufactured by sequentially stacking the anode 112, the cathode 114, and the separator 113 upon one another to form a stack, rolling the stack in a spiral form, and accommodating the rolled up stack in the battery case 120.

The cathode 114 includes a cathode current collector, and a cathode active material layer disposed on the cathode current collector. The cathode current collector may have a thickness of about 3 µm to about 500 µm. The cathode current collector is not particularly limited, and may be formed of any material so long as it has a suitable conductivity without causing chemical changes in the fabricated battery. Examples of the cathode current collector include copper, stainless steel, aluminum, nickel, titanium, sintered carbon, copper or stainless steel that is surface-treated with carbon, nickel, titanium or silver, and aluminum-cadmium alloys. In addition, the cathode current collector may be processed to have fine irregularities on surfaces thereof so as to enhance adhesive strength of the cathode current collector to the cathode active material, and may be used in any of various forms including films, sheets, foils, nets, porous structures, foams, and non-woven fabrics. The cathode active material layer includes a cathode active material, a binder, and a conducting agent.

The anode active layer includes an anode active material, a binder, and optionally a conducting agent. The anode active material is not particularly limited, and may be selected from any anode active materials used in the art. Non-limiting examples of the anode active material are lithium metal, a lithium metal alloy, a transition metal oxide, a doped or undoped lithium material, and a material that allows reversible intercalation and deintercalation of lithium ions, which may be used as a mixture or in combination of at least two thereof. The lithium metal alloy may be an alloy of lithium with a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn). Non-limiting examples of the transition metal oxide are tungsten oxide, molybdenum oxide, titanium oxide, lithium titanium oxide, vanadium oxide, and lithium vanadium oxide. Examples of the material that allows doping or undoping of lithium therein are Si, Sn, Al, Ge, Pb, Bi, Sb, and a Si—Y alloy (where Y is an alkali metal, a alkali earth metal, a Group 11 element, a Group 12 element, a Group 13 element, a Group 14 element, a Group 15 element, a Group 16 element, a transition metal, a rare earth element, and a combination thereof, except for Sn. For example, Y may be magnesium (Mg), calcium (Ca), strontium (Sr), barium (Ba), radium (Ra), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), seaborgium (Sg), technetium (Tc), rhenium (Re), iron (Fe), lead (Pb), ruthenium (Ru), osmium (Os), rhodium (Rh), iridium (Jr), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), or combinations thereof.

The material that allows reversible intercalation and deintercalation of lithium ions may be any carbonaceous anode active material that is commonly used in a lithium battery. Examples of such carbonaceous materials are crystalline carbon, amorphous carbon, or mixtures thereof. Non-limiting examples of the crystalline carbon are natural graphite, artificial graphite, expanded graphite, graphene, fullerene soot, carbon nanotubes, and carbon fiber. Non-limiting examples of the amorphous carbon are soft carbon (carbon sintered at low temperatures), hard carbon, mesophase pitch carbides, and sintered corks. The carbonaceous anode active material may be in, for example, spherical, planar, fibrous, tubular, or powder form.

The binder strongly binds anode active material particles together and to the anode current collector. Non-limiting examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon.

The conducting agent is used to provide conductivity to the anode. Any electron conducting material that does not induce chemical change in batteries may be used. Examples of the conducting agent are carbonaceous materials, such as natural graphite, artificial graphite, carbon black, acetylene black, ketjen black, carbon fibers, and the like; metal-based materials, such as copper (Cu), nickel (Ni), aluminum (Al), silver (Ag), and the like, in powder or fiber form; and conductive materials, including conductive polymers, such as a polyphenylene derivative, and mixtures thereof.

The amounts of the anode active material, the binder, and the conducting agent may be equivalent to those commonly used in lithium batteries. For example, a weight ratio of the anode active material to a mixture of the conducting agent and the binder may be from about 98:2 to about 92:8. A mixing ratio of the conducting agent to the binder may be, but not limited to, from about 1:1.5 to about 1:3. The anode 112 and the cathode 114 may be each manufactured by mixing an active material, a conducting agent, and a binder in a solvent to prepare an active material composition, and coating the active material composition on a current collector. Any method of manufacturing such electrodes which is known to one of ordinary skill in the art may be used. Thus, a detailed description thereof will not be provided herein. Non-limiting examples of the solvent are N-methylpyrrolidone ("NMP"), acetone, and water.

A separator may be disposed between the cathode and the anode, according to the type of the lithium secondary battery. The separator helps maintain electrical isolation between the cathode and the anode. The separator may be any separator that is commonly used for lithium batteries. In particular, the separator may have low resistance to migration of ions in an electrolyte and have high electrolyte-retaining ability. Examples of the separator are glass fiber, polyester, Teflon, polyethylene, polypropylene, polyvinylidene fluoride ("PVDF"), polytetrafluoroethylene ("PTFE"), and a combination thereof, each of which may be a nonwoven fabric or a woven fabric. The separator may be a single layer or a multi-layer. Examples of the separator are a polyethylene/polypropylene double-layer separator, polyethylene/polypropylene/polyethylene triple-layer separator, and a polypropylene/polyethylene/polypropylene triple-layer separator. The separator may have a pore diameter of about 0.01 to about 10 µm and a thickness of about 3 to about 100 µm. The electrolyte may be injected between the cathode 114 and the anode 112 with the separator 113 therebetween.

A separator may include fibers, particles, web, porous sheets, or other forms of material configured to reduce the risk of physical contact and/or short circuit between the electrodes. The separator may be a unitary element, or may include a plurality of discrete spacer elements such as particles or fibers. In some examples, the electrolyte layer may include a separator infused with an electrolyte solution. In some examples such as a polymer electrolyte, the separator may be omitted.

See: U.S. Pat. Nos. 8,318,353; 7,901,810; 7,790,319; 7,771,628; 7,759,008; 7,041,239; 6,872,492; 4,355,162; 4,376,709; 4,376,709; 4,459,406; 5,849,434; 6,844,047; 6,872,492; 6,872,492; 6,888,663; 6,958,860; 7,041,239; 7,338,734; 7,383,083; 7,759,008; 7,759,008; 7,771,628; 7,790,319; 7,901,810; 7,939,201; 7,955,733; 7,960,058; 7,964,308; 7,972,728; 7,988,746; 7,998,617; 8,003,250; 8,057,936; 8,067,117; 8,088,512; 8,148,009; 8,148,013; 8,158,090; 8,168,326; 8,206,468; 8,206,469; 8,218,351; 8,241,789; 8,277,975; 8,282,691; 8,318,353; 8,323,831; 8,323,832; 8,361,661; 8,420,258; 8,435,678; 8,445,135; 8,449,980; 8,481,208; 8,492,031; 8,580,430; 8,586,238; 8,617,430; 8,617,745; 8,652,683; 8,658,310; 8,709,647; 8,722,227; 8,722,227; 8,722,242; 8,734,539; 8,785,043; 8,821,763; 8,852,807; 8,932,762; 8,936,871; 8,951,676; 8,951,680; 8,993,171; 8,999,571; 9,065,093; 9,077,032; 9,293,790; 9,299,966; 9,305,716; 9,349,544; 9,362,562; 20020192553; 20020192553; 20020192553; 20040005265; 20040016632; 20040016632; 20040048157; 20040066556; 20040197654; 20040197654; 20040262571; 20040262571; 20050238961; 20050238961; 20050238961; 20060110580; 20060194112; 20060194112; 20060292444; 20070031732; 20070072034; 20070072034; 20070141468; 20070141468; 20070166617; 20070190418; 20070248520; 20070292747; 20070298317; 20080261113; 20080261113; 20090214944; 20090220838; 20090220838; 20090246636; 20090311597; 20100075225; 20100078591; 20100233545; 20100266899; 20100266899; 20100303701; 20110052473; 20110052986; 20110052986; 20110052986; 20110052995; 20110159381; 20110195306; 20110200848; 20110200848; 20110229765; 20110229765; 20110274948; 20120140378; 20120164499; 20120164499; 20120214071; 20120219856; 20120219859; 20120237828; 20120270109; 20120315538; 20130034780; 20130052492; 20130059211; 20130078523; 20130078524; 20130084474; 20130084474; 20130084474; 20130115521; 20130252112; 20130252114; 20130302697; 20130344367; 20130344367; 20140099557; 20140220450; 20140242445; 20140302403; 20140370388; 20150111105; 20150132650; 20150236342; 20150236349; 20150263382; 20150303474; 20150303474; 20150311565; 20150364753; 20160028114; 20160096334; 20160111720; and 20160164152, each of which is expressly incorporated herein by reference in its entirety.

See also:

Berrah, Fadila, et al. "The vanadium monophosphates AVOPO$_4$: Synthesis of a second form β-KVOPO$_4$ and structural relationships in the series." *Solid state sciences* 3.4 (2001): 477-482.

Zima, Vítěrslav, et al. "Ion-exchange properties of alkalimetal redox-intercalated vanadyl phosphate." *Journal of Solid State Chemistry* 163.1 (2002): 281-285.

Lii, Kwang-Hwa, and Wei-Chuan Liu. "RbVOPO$_4$ and CsVOPO$_4$, Two Vanadyl (IV) Orthophosphates with an Intersecting Tunnel Structure and Discrete VO$_5$ Pyramids." *Journal of Solid State Chemistry* 103.1 (1993): 38-44.

Yakubovich, O. V., O. V. Karimova, and O. K. Mel'nikov. "The mixed anionic framework in the structure of Na$_2${MnF [PO$_4$]}." *Acta Crystallographica Section C: Crystal Structure Communications* 53.4 (1997): 395-397.

Schindler, M., F. C. Hawthorne, and W. H. Baur. "Crystal chemical aspects of vanadium: polyhedral geometries, characteristic bond valences, and polymerization of (VO n) polyhedra." *Chemistry of Materials* 12.5 (2000): 1248-1259.

Panin, Rodion V., et al. "Crystal Structure, Polymorphism, and Properties of the New Vanadyl Phosphate Na$_4$VO (PO$_4$)$_2$." *Chemistry of materials* 16.6 (2004): 1048-1055.

Belkhiri, Sabrina, Djillali Mezaoui, and Thierry Roisnel. "The Structure Determination of a New Mixed Mono-Arsenate K$_2$V$_2$O$_2$ (AsO$_4$)$_2$." 3ème *Conference Internationale sur le Soudage, le CND et l'Industrie des Materiaux et Alliages (IC-WNDT-MI'12)*. Centre de Recherche Scientifique et Technique en Soudage et Controle (CSC), 2012.

Glasser, Leslie, and C. Richard A. Catlow. "Modelling phase changes in the potassium titanyl phosphate system." *Journal of Materials Chemistry* 7.12 (1997): 2537-2542.

Fedotov, Stanislav S., et al. "AVPO$_4$F (A=Li, K): A 4 V Cathode Material for High-Power Rechargeable Batteries." *Chemistry of Materials* 28.2 (2016): 411-415.

Belkhiri, Sabrina, Djillali Mezaoui, and Thierry Roisnel. "K$_2$V$_2$O$_2$ (AsO$_4$)$_2$." *Acta Crystallographica Section E: Structure Reports Online* 68.7 (2012): i54-i54.

Yakubovich, O. V., V. V. Kireev, and O. K. Mel'nikov. "Refinement of crystal structure of a Ge-analogue of natisite Na$_2$ {TiGeO$_4$} and prediction of new phases with anionic {MTO$_5$} radicals." *Crystallography Reports* 45.4 (2000): 578-584.

Boudin, S., et al. "Review on vanadium phosphates with mono and divalent metallic cations: syntheses, structural relationships and classification, properties." *International Journal of Inorganic Materials* 2.6 (2000): 561-579.

SUMMARY OF THE INVENTION

The present technology provides a vanadyl phosphates ε-VOPO$_4$ cathode which has achieved multi-electron storage as lithium ion battery cathode. Vanadyl phosphates in general have low intrinsic conductivity. A high efficiency battery cathode should have low electrical resistance. To overcome the conductivity problem, the cathode material is preferably nanosized, and coated with particles of a low activation energy conductive material, such as graphene or carbon nanotubes. This cathode utilizes the two redox couples of vanadium cation (i.e. $V^{5+}/V^{4+}$, $V^{4+}/V^{3+}$) to permit more than one lithium ion to be stored in the unit structure per vanadium ion. The involvement of the multiple redox processes of vanadium is reflected by the well separated high voltage plateau region at ~3.8 V and low voltage plateau region at ~2 V.

The two-electron redox property of vanadium results in a theoretical capacity of 305 mAh/g. In practical, maximum discharge capacity of over 300 mAh/g was obtained within the voltage region of 1.3-4.5 V vs. Li/Li$^+$, which is over 90% of the theoretical value.

The electrode material is not limited to use in batteries, or as a cathode, or for use in lithium ion electrolyte systems.

In addition to ε-VOPO$_4$ material, the cathode may further contain any cathode material suitable for lithium-ion insertion and release. Suitable auxiliary materials may include phosphate based materials such as $FePO_4$, $VPO_4F$, $V_2(PO_4)_2F_3$, $FePO_4F$, and $V_2(PO_4)_3$; oxides such as $CoO_2$, orthorhombic $MnO_2$, layered iron oxides $FeO_2$, chromium oxide $CrO_2$, layered $Ni_{0.5}Mn_{0.5}O_2$, and $V_6O_{15}$ nanorods; layer sulfides such as $TiS_2$; perovskite transition metal fluorides, or a mixture thereof.

The epsilon polymorph of vanadyl phosphate, $\varepsilon$-$VOPO_4$, made from the hydrothermally or more generally, solvothermally synthesized $H_2VOPO_4$, is a cathode material for lithium-ion batteries that has been optimized to reversibly intercalate two Li-ions to reach the full theoretical capacity at least 50 cycles with a coulombic efficiency of 98%. This material adopts a stable 3D tunnel structure and can extract two Li-ions per vanadium ion, giving a theoretical capacity of 305 mAh/g, with an upper charge/discharge plateau at around 4.0 V, and one lower at around 2.5 V. As $\varepsilon$-$VOPO_4$ is capable of reversibly intercalating more than one lithium ion into the structure, it stores and delivers more energy than current batteries in the market. Compared to $LiFePO_4$, $\varepsilon$-$VOPO_4$ has a higher electronic conductivity and higher energy density with the insertion of one Li-ion, 159 mAh/g at 4.0 V vs 170 mAh/g at 3.45 V. Overall, $\varepsilon$-$VOPO_4$ makes a great candidate for next generation of high energy Li-ion batteries. The nano-sized $\varepsilon$-$VOPO_4$ particles demonstrate enhanced electrochemistry and cyclability for potential applications in lithium-ion batteries.

Phosphate based materials have been considered as excellent cathode candidates because of their high stability and low cost. However, most phosphate cathodes show poor electronic conductivity and as a result, full capacity of the cathode can't be achieved in the traditional charge/discharge processes.

One approach to obtain a cathode of high capacity is to employ a transition metal capable of multiple electron transfer, and thus able to assume more than one lithium. Vanadium is well-known to be capable of transfer of two electrons, such as from the +5 to +3 oxidation state.

Vanadyl phosphate ($VOPO_4$) is a material combining the merits of vanadium and of phosphate and theoretically has the possibility to show high capacity as well as good stability as a cathode active material for a sodium battery. The vanadyl phosphates with formula of $AVOPO_4$ (A=alkali metal) form a class of materials which can serve as a multi-electron cathode. These cathodes can utilize the $V^{3+}$-$V^{4+}$-$V^{5+}$ redox couples, during which two ions can be reversible stored in the structure instead of one. Therefore, this class of cathode materials is expected to exhibit much higher energy density than the traditional one-electron cathodes. By far, the two-electron behavior only has been observed in Li ion system (i.e. two-Li) in some different phases of $VOPO_4$ and $LiVOPO_4$, within a voltage window covering the $V^{3+} \rightarrow V^{5+}$ transition, which exhibits enhanced practical energy densities.

Vanadium phosphate materials have been described as cathode materials.

It is an object of this invention to a high energy density cathode active material for use in a lithium battery, using $\varepsilon$-$VOPO_4$ as an active material, and which comprises a conductivity enhancer comprising graphene or carbon nanotubes.

The cathode containing any of the above-listed materials may be mixed with other electrically conductive materials and binders. Examples of electrically conductive materials include carbon black and vapor ground carbon fibers. Examples of binders include polyvinylidene fluoride (PVDF), sodium alginate, and sodium carboxymethyl cellulose.

The cathode active material may be mixed with binders recognized by one of skill in the art as suitable for lithium-ion batteries. For example, suitable binders may include PVDF, polytetrafluoroethylene (PTFE), styrene butadiene rubber (SBR), and polyimide.

According to the present invention, the conductive additive is graphene or carbon nanotubes. The amount of conductive additive may be 1-10% by weight, and preferably about 5%.

The cathode active material may be present as a sheet, ribbon, particles, or other physical form. An electrode containing the cathode active material may be supported by a current collector. A current collector may include a metal or other electrically conducting material. The current collector may be formed of carbon, carbon paper, carbon cloth or a metal or noble metal mesh or foil.

U.S. Pat. No. 9,722,247 (Zhang et al.) discusses $\varepsilon$-Vanadyl phosphates as high energy density cathode materials for rechargeable sodium batteries.

For example, U.S. Pat. No. 6,872,492 (Barker et al.) describes sodium ion batteries based on cathode materials of the general formula: $A_aM_b(XY_4)_cZ_d$. Example 4b describes synthesis of $VOPO_4 \times H_2O$ and Examples 4c and 4d describe synthesis of $NaVOPO_4$. Charge and discharge of a cell containing a cathode of the $NaVOPO_4$ and a negative electrode of lithium metal is described. Sodium ion cells prepared are based on a carbon composite negative electrode and $NaVOPO_4F$ as the positive electrode active material.

U.S. 2013/0034780 (Muldoon et al.) describes a magnesium battery and lists $VOPO_4$ as a suitable positive electrode active material.

U.S. 2004/0048157 (Neudecker et al.) describes a lithium solid state thin film battery containing a lithiated vanadium oxide film as an anode and as one possible cathode material, $LiVOPO_4$.

U.S. 2013/0260228 (Sano et al.) describes a lithium secondary battery having as a positive electrode material, a compound of the formula: $Li_a(M)_b(PO_4)_cF_d$. $LiVOPO_4$ is described in a preferred embodiment.

U.S. 2013/0115521 (Doe et al.) describes a magnesium secondary battery wherein the current collectors are coated with a thin protective coating. $VOPO_4$ is listed as a positive electrode active material.

U.S. 2012/0302697 (Wang et al.) describes a magnesium cell having a carbon or other graphitic material as a cathode active material. $VOPO_4$ is included in a list of other cathode active materials.

Kerr, T. A., J. Gaubicher, and L. F. Nazar. "Highly Reversible Li Insertion at 4 V in $\varepsilon$-$VOPO_4$/$\alpha$-$LiVOPO_4$ Cathodes." Electrochemical and Solid-State Letters 3, no. 10 (2000): 460-462 discusses a $\varepsilon$-$VOPO_4$/$\alpha$-$LiVOPO_4$ cathodes for a lithium battery having 100 mA/g capacity.

Quackenbush, Nicholas F., Linda Wangoh, Bohua Wen, Ruibo Zhang, Youngmin Chung, Natasha Chernova, Zehua Chen et al. "Interfacial Effects of Electrochemical Lithiation of Epsilon-$VOPO_4$ and Evolution of the Electronic Structure." In Meeting Abstracts, no. 6, pp. 491-491. The Electrochemical Society, 2015 discusses the use of $\varepsilon$-$VOPO_4$ as a cathode material in lithium batteries, which achieves dual cation exchange only on particle surfaces, and not in the bulk material.

Seven distinct $VOPO_4$ structures or phases are known. All of the reported structures contain $VO_6$ octahedra sharing vertices with $PO_4$ tetrahedra. The oxygen polyhedron of vanadium is irregular so that it is often considered as a $VO_5$ square pyramid with a very short apical vanadyl bond (V=O) and a much more remote sixth oxygen atom (V . . . O). These seven phases can be distinguished as:

$α_I$: has a lamellar structure with alternating antiparallel V=O bonds pointing inside the layers.

$α_{II}$: also has a lamellar structure with antiparallel V=O bonds pointing outside the layers.

γ: is an intermediate form between $α_I$ and $α_{II}$ with half parallel V=O bonds pointing inside, half outside the layers.

δ: has antiparallel V=O bonds pointing half inside, half outside the layers. The vanadyl chains point to different directions in the unit cell.

ω: shows disordered vanadyl chains in the [1 0 0] and [0 1 0] directions of the tetragonal cell.

β: All vanadyl chains are parallel and tilted to form zigzag O=V . . . O=V chains.

ε: The structure is a distorted form of β-phase and differs in terms of tilted O=V . . . O angle.

It is therefore an object to provide an intercalation-type electrode composition for a lithium ion battery cathode, having a capacity of at least 275 mAh/g, and may have a capacity of at least 280 mAh/g, at least 290 mAh/g, at least 300 mAh/g, or at least 305 mAh/g, for example. The intercalation electrode composition may comprise a transition metal having a two-electron redox property, having a discharge capacity of at least 75% of theoretical value, at least 80% of theoretical value, at least 85% of theoretical value, or at least 90% of theoretical value.

The lithium ion battery cathode may comprise a transition metal, which undergoes a change in oxidation state of at least two between a charged and discharged state.

The intercalation electrode composition preferably comprises $VOPO_4$, most preferably in the epsilon form, i.e., ε-$VOPO_4$. The intercalation electrode composition preferably has a conductivity enhancer comprising graphene or carbon nanotubes. The intercalation electrode composition may comprise ε-$VOPO_4$ and at least 2.5% by weight graphene, at least 3.0% by weight graphene, at least 3.5% by weight graphene, at least 4.0% by weight graphene, at least 5% by weight graphene, at least 6% by weight graphene, at least 7% by weight graphene, at least 8% by weight graphene, at least 9% by weight graphene, or at least 10% by weight graphene.

The intercalation electrode composition may comprise, for example, at least 75% by weight ε-$VOPO_4$, at least 5% by weight graphene nanoplatelets, and at least 5% by weight of a poly vinylidene fluoride (PVDF) binder. The intercalation electrode composition may comprise 85% by weight ε-$VOPO_4$, at least 5% by weight graphene nanoplatelets, and 10% by weight binder. The intercalation electrode composition may comprise 75% by weight ε-$VOPO_4$, 15% by weight graphene nano platelets, and 10% by weight of a poly vinylidene fluoride (PVDF) binder.

The intercalation electrode composition may be provided as a cathode in a battery comprising a lithium ion anode, an electrolyte adapted to operate at a battery potential of at least 4.5V, a separator, and a supporting lithium salt.

The intercalation electrode composition may have a first state in which at least 80 mol % of a transition metal element is oxidized in a first oxidation state, and a second state in which at least 80 mol % of a transition metal element is oxidized in a second oxidation state, the first state and the second state differing by two, and the at least 80 mol % of the transition metal element in the first state is associated with two lithium ions per transition metal element ion.

Another object provides a lithium ion battery cathode composition, comprising ε-$VOPO_4$, electrically conductive graphene in a ratio of at least 3% by weight of the ε-$VOPO_4$, and a binder, on a current collector substrate.

A further object provides an intercalation electrode composition for a lithium ion cathode, having a dual lithium ion exchange characteristic, having a capacity of about 125 mAh/g at a voltage exceeding 3.7 V, and a capacity of about 260 mAh/g at a voltage exceeding 2.0 V.

A still further object provides an intercalation electrode composition for a lithium ion cathode, having a dual lithium ion exchange characteristic, having an energy capacity of at least 850 mWh/g. The energy capacity may be at least 860 mWh/g, at least 870 mWh/g, an energy capacity of at least 880 mWh/g, an energy capacity of at least 890 mWh/g, or an energy capacity of at least 900 mWh/g.

Another object provides an electrode composition for a lithium ion cathode, comprising ε-$VOPO_4$ having a theoretical capacity of 305 mA/g and an observed capacity of at least 275 mAh/g. The observed capacity may be at least 280 mAh/g, at least 285 mAh/g, at least 290 mAh/g, at least 295 mAh/g, or at least 300 mAh/g.

A further object provides an electrode, comprising a ε-$VOPO_4$ lithium ion exchange active material, graphene nanoplatelets, and a binder, having an energy density of 900 mWh/g.

A still further object provides an electrode, comprising a ε-$VOPO_4$ lithium ion exchange active material, having a current-voltage profile which displays peaks at about 2.1 V, 2.25 V, 2.5 V, and 3.9 V. representing a dual-lithium ion exchange per vanadium ion of at least 90%.

An object also provides a method of making a lithium ion battery cathode, comprising: hydrothermally or solvothermally generating ε-$VOPO_4$; mixing the ε-$VOPO_4$, with graphene nanoplatelets and a binder for form a mixture and coating a current collector with a slurry of the mixture. The graphene nanoplatelets may a surface area of 750 $m^2$/g, for example. The binder may be polyvinylidene fluoride. The weight ratio of ε-$VOPO_4$, graphene nanoplatelets, and polyvinylidene fluoride may be 75:15:10.

The invention comprises the cathode material, an electrode formed of the cathode material, and electrochemical devices, e.g., a secondary battery, formed using the electrode.

Other object will be apparent from a review hereof.

BRIEF DESCRIPTION OF THE DRAWINGS

These and/or other aspects will become apparent and more readily appreciated from the following description of the embodiments, taken in conjunction with the accompanying drawings in which:

FIG. 5A shows galvanostatic charge-discharge curves of ε-$VOPO_4$ from 1.6 to 4.5 V at C/20.

FIG. 5B shows cycle performance of ε-VOPO$_4$ from 1.6 to 4.5 V at C/20, 1 C=2Li.

FIG. 6A shows galvanostatic charge-discharge curves of ε-VOPO$_4$ at the low voltage region, from 1.6 to 3.0 V.

FIG. 6B shows cycle performance in the low voltage region, 1.6 to 3.0 V, of ε-VOPO$_4$ at C/50, 1 C=2Li.

DETAILED DESCRIPTION OF THE PREFERRED EMBODIMENTS

Figure 1A:
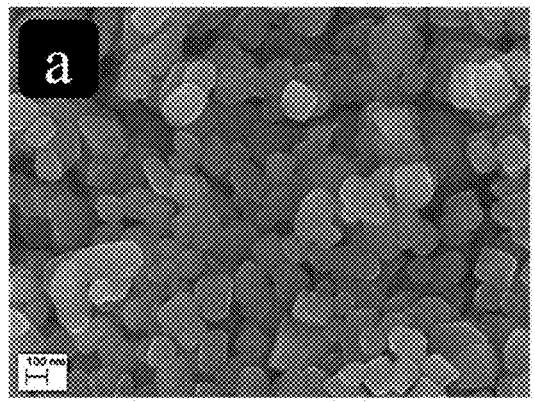
FIG. 1A shows morphological and structure characterization of ε-$VOPO_4$ SEM image.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present there-between. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, are appropriate for use only if consistent with a meaning that is consistent with their meaning in the context of the relevant art and the present disclosure, and will not be interpreted in an idealized or overly formal sense unless expressly so defined herein. Thus, such resources as "Merriam Webster" (any version) are secondary to field of science-appropriate technical dictionaries and encyclopedias.

One or more embodiments will now be described in detail with reference to the following examples. However, these examples are not intended to limit the scope of the one or more embodiments.

The basis of the lithium-ion battery (LIB) uses lithium-ions to travel across the electrolyte and intercalate into the anode upon charge and into the cathode upon discharge [1]. Because they outperform competing primary batteries like lead-acid, alkaline, etc., as well as other rechargeable batteries such as nickel-metal hydride, nickel cadmium, etc., it is no wonder how the LIB has revolutionized and expanded the mobile electronics industry since 1991 [2]. While the performance and functionality of smartphones and laptops continue to improve, the development of LIBs need to catch up to match in terms of power and life cycle to expand into large energy storage applications.

Currently, the cathode material in the market is dominated by LiCoO$_2$. While it has an extremely high theoretical capacity of 274 mAh/g with an operating voltage around 3.6 V, the structure tends to undergo irreversible changes when more than 50% of the Li-ions are removed [3]. Environmental safety and the cost became major concerns as well, thus, drove the search for alternatives where the scarce and toxic cobalt is substituted by other metals such as in LiNi$_{1/3}$Mn$_{1/3}$Co$_{1/3}$O$_2$, also known as NMC [4]. Extensive research for developing alternative cathode materials lead to study of metal phosphates, thus came the LiFePO$_4$. This olivine material has garnered a great deal of attention that it has been commercialized for portable and stationary systems by A123, BAE Systems and in China. In fact, Hydro-Quebec, MIT and A123 further improved this material with high-power performance that can charge and discharge within minutes through nanosizing and carbon coating [5]. Through a collaborative effort from NECCES-I, a fundamental study on this phenomenon determined a metastable reaction mechanism of LiFePO$_4$ which is why it can cycle at high rates [6].

Another way to leverage in the stability of phosphates and to increase energy storage is to incorporate a second electron. Hautier et al. plotted the mean voltage for each per metal redox couple with respect to the capacity in a phosphate, giving way to consider two electron couples. Vanadium phosphate compounds were candidates within the acceptable voltage window [7]. The ε-VOPO$_4 \leftrightarrow$ ε-LiVOPO$_4 \rightarrow$ ε-Li$_2$VOPO$_4$ system has been regarded as one of the most promising and safe candidates to provide a two-electron reaction with a high theoretical capacity of 305 mAh/g and specific energy over 900 Wh/g [8, 15, 16]. This system has two redox potentials at useful potentials for storing energy, V$^{3+}$4$\leftrightarrow$V$^{4+}$ at 4.0 V and V$^{4+}\leftrightarrow$V$^{5+}$ at 2.5 V. ε-VOPO$_4$ was first synthesized by Lim et al. by heating monoclinic H$_2$VOPO$_4$ in oxygen, and Kerr et al. measured the electrochemical reversibility at the high voltage plateau at 4.0 V [9, 10]. Previously, the synthesis and characterization of ε-VOPO$_4$ from two different phases of H$_2$VOPO$_4$ was reported, to discover that the electrochemical performance from the disordered tetragonal precursor was improved due to smaller particle size [11]. Fundamental studies were conducted on the structural evolution of ε-LiVOPO$_4$ and two intermediate phases in the low-voltage regime identified using DFT calculations backed up with X-ray pair distribution function analysis and X-ray absorption near edge structure measurements [12]. The insertion of two Li-ions into ε-VOPO$_4$ has been demonstrated, reaching the theoretical specific capacity of 305 mAh/g.

Example 1

Synthesis: ε-VOPO$_4$ was synthesized by calcining the monoclinic H$_2$VOPO$_4$ precursor, as reported by Song et al. [11] Stoichiometric amounts of VCl$_3$ (Sigma-Aldrich, 97%), and P$_2$O$_5$ (Sigma-Aldrich, ≥98%) were dissolved in 190 proof ethanol (Pharmco-AAPER). The solution was placed in a 4748 Type 125 mL PTFE-lined reactor (Parr Instrument Co.) and the reaction was set to 180° C. for 72 hours. The solvothermal product was collected by centrifugation and heated at 550° C. in flowing oxygen for 3 hours.

Materials Characterization:

For XRD measurements, a Bruker D8 Advanced X-ray diffractometer equipped with Cu Kα source, λ=1.54178 Å. The intensities were recorded within the 2θ range from 10° to 80° with 2θ steps of 0.02° from powder samples. The unit cell parameters were obtained by Rietveld refinement with the TOPAS program. Scanning electron microscopy (SEM) measurements were performed with a Zeiss Supra-55 VP field emission scanning electron, using both the secondary electron and InLens modes to determine the morphology and particle size, at an acceleration voltage of 10 kV. Transmission electron microscopy (TEM) imaging was performed using the FEI Titan 80-300 microscope with a field emission gun (FEG) and an image aberration corrector, operated at an acceleration voltage of 300 kV. The pristine material was dispersed on a copper grid coated with a lacey carbon film for high-resolution transmission electron microscopy (HR-TEM) observation.

Electrochemistry:

The electrodes were prepared by mixing the active material, ε-VOPO$_4$, with graphene nanoplatelets (surface area 750 m$^2$/g, XG Sciences) as a carbon additive and polyvinylidene fluoride (PVDF, Aldrich) binder in a weight ratio of 75:15:10. The slurry was created by adding 1-methyl-2-pyrrolidinone (NMP, Aldrich) which was then laminated onto an aluminum foil 144 current collector and vacuum-dried overnight before use. The dried electrodes, of area 1.2 cm$^2$, contained 8-10 mg of active material and were assembled in 2325-type coin cells in a He-filled glovebox with a pure lithium chip (thickness 0.38 mm, Aldrich) as the counter and reference electrode. The electrolyte used was lithium hexafluorophosphate (1 M LiPF$_6$) dissolved in ethylene carbonate (EC) and dimethyl carbonate (DMC) in 1:1 volume ratio with Celgard 2400 (Hoechst Celanese) as the separator. The electrochemical properties were investigated using the Bio-Logic VMP multichannel potentiostat. The cells were cycled galvanostatically in the high voltage region (3.0-4.5 V), low voltage region (1.6-3.0 V) and the whole voltage (1.6-4.5 V) window at C/50, where 1 C=2 Li or 305 mAh/g per gram of Li$_2$VOPO$_4$. Cells were also cycled at C/20 over the whole voltage range.

Hydrothermal or solvothermal synthesis has many unique advantages because it offers good control over the sample's purity and crystallinity, easy to scale up and low cost. This method can keep the overall particle size small and size distribution narrow which are vital features for good cathodic electrochemical performance. FIG. 1A shows the as-synthesized ε-VOPO$_4$ powder as nano-sized primary particles, ~100-200 nm, that are cuboid in shape. This material matched well with earlier reported results from Chen et al., where ε-VOPO$_4$ synthesized from monoclinic H$_2$VOPO$_4$ are made up of single crystals up to 200 nm [13]. Achieving small primary particles is important because it can improve the rate property for Li intercalation. Azmi et al. reported that smaller LiVOPO$_4$ particle size results in easier lithium-ion diffusion with enhanced columbic efficiency by improving the capacity of lithium deintercalation upon discharge and the decreasing the lithium intercalation potential upon charge [14]. It is also observed in FIG. 1A, that the nano-sized ε-VOPO$_4$ primary particles do not agglomerate nor form into secondary particles, providing a good surface area for the graphene or carbon nanotube additive to wrap around and assist in electron migration during the charge/discharge process.

Figure 1B:
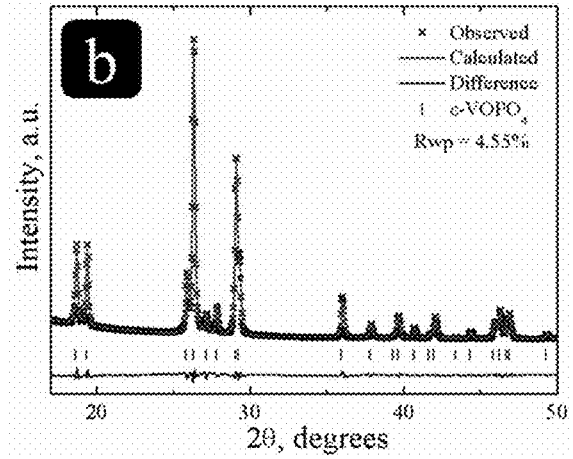
FIG. 1B shows an XRD pattern with Rietveld refinement of the as-synthesized ε-$VOPO_4$.

The lack of primary particle agglomeration is attributed to the choice of solvent used for synthesis. By using 190 proof ethanol, ε-VOPO$_4$ results in loose particle morphology whereas 200 proof ethanol results in the formation of 2 μm balls as secondary particles. By using this solvothermal synthesis route, the precursor was successfully synthesized and calcined to produce pure crystalline ε-VOPO$_4$, as seen in FIG. 1B, resulting in sharp and narrow peaks in the x-ray diffraction pattern. The observed pattern matched very well to the calculated pattern with no impurities or other vanadyl phosphate phases, resulting in a low R$_{wp}$ value of 4.55%.

Figure 2:
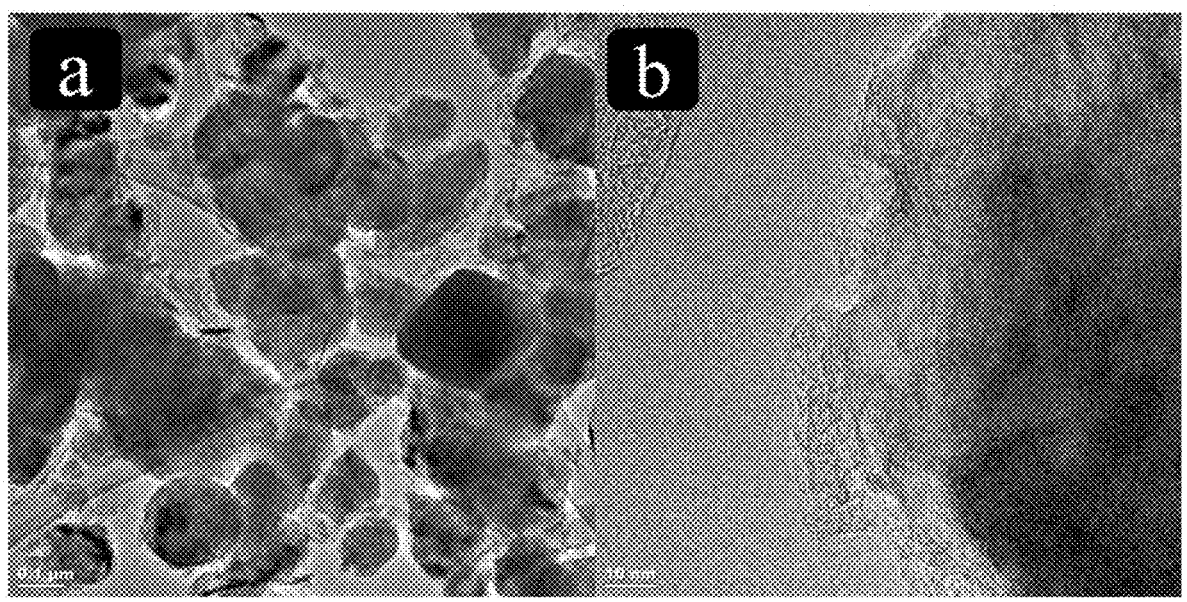
FIG. 2 shows TEM images of ε-$VOPO_4$ hand ground with graphene nanoplatelets for electrode preparation.

Normally, ball-mill treatment is necessary to break up any agglomeration and secondary particles and to reduce the particle size for good electrochemical performance. However, since the as-synthesized ε-VOPO$_4$ is of nanometer size, there is no need to use this application, which helps preserve the crystal structure for better reversible intercalation chemistry. FIG. 2 shows HRTEM images of 75 wt. % ε-VOPO$_4$ that was hand milled with 15 wt. % graphene nanoplatelets in a mortar and pestle before adding 10 wt. % PDVF and NMP for electrode preparation. FIG. 2 shows graphene nanoplatelets forming a conductive network between every single ε-VOPO$_4$ primary particle. Upon closer inspection at FIG. 2B, HRTEM shows that the graphene nanoplatelets coated on the ε-VOPO$_4$ particle is around 10 nm thick.

Figure 3A:
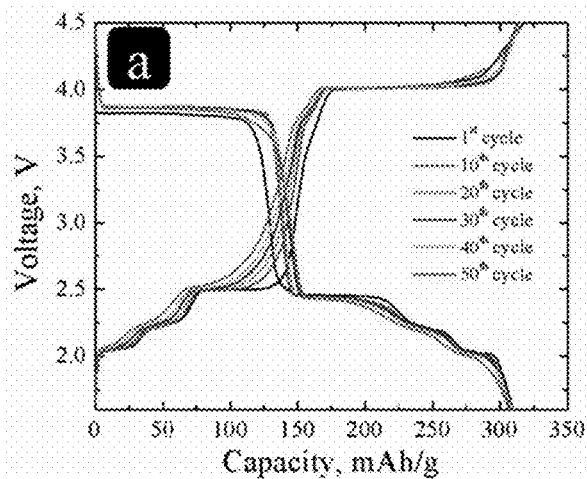
FIG. 3A shows galvanostatic charge-discharge curves of ε-$VOPO_4$ from 1.6 to 4.5 V at C/50.
Figure 3B:
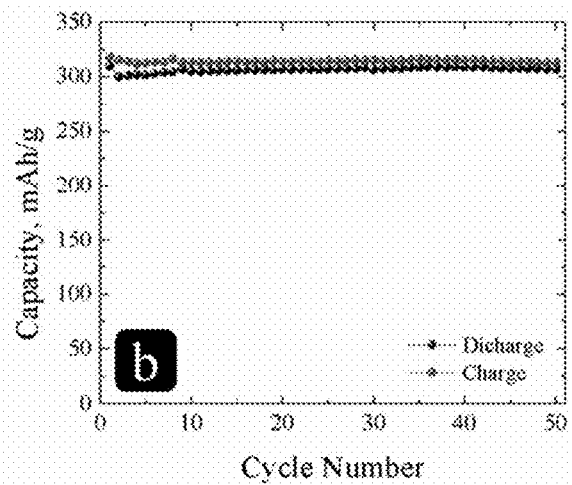
FIG. 3B shows cycle performance of ε-$VOPO_4$ from 1.6 to 4.5 V at C/50, 1 C=2 Li.

Electrochemistry of ε-VOPO$_4$: FIGS. 3A and 3B show ε-VOPO$_4$ cycled in the whole voltage window from 1.6 V to 4.5 V at C/50, capable of achieving a high discharge capacity of 305 mAh/g for at least 50 cycles. FIG. 2A displays the desired characteristic plateaus at ~4.0 V at the high voltage region and at ~2.5, 2.25, 2.0 V at the low voltage region. The drop from the high voltage region to the low voltage region is a step-like curve and the hysteresis gap between the charge and discharge curve is very small. The high voltage region has a long plateau which extends the capacity to ~150 mAh/g, equivalent to ~1 Li. This corresponds to the redox potential of V$^{3+}$ and V$^{4+}$ where ε-VOPO$_4$ becomes ε-LiVOPO$_4$. The low voltage region has three plateaus at 2.5, 2.25 and 2.0 V which also extends the capacity to ~150 mAh/g, corresponding to the second intercalation of lithium where ε-LiVOPO$_4$ becomes ε-Li$_2$VOPO$_4$. The plateaus at the low voltage region has maintained step-like curves even after 35 cycles, suggesting good kinetics and the changes in the local structure may be reversible for easy Li intercalation.

Figure 4:
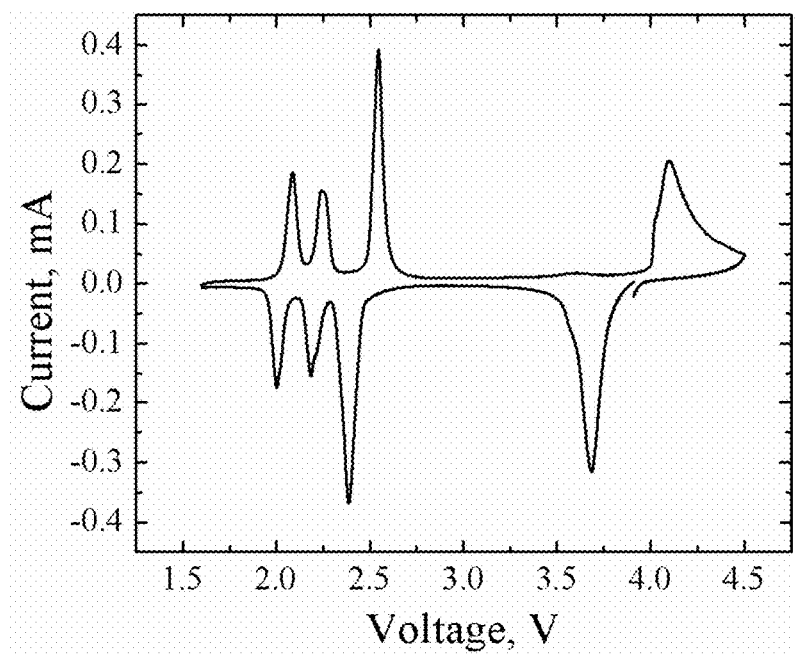
FIG. 4 shows a CV curve profile of ε-$VOPO_4$ at a scan rate of 0.02 mV/s.

Cyclic voltammetry (CV) curves was measured in the voltage window of 1.6 V to 4.5 V to understand the redox process of ε-VOPO$_4$ is shown in FIG. 4. There are four reduction peaks at certain voltages that correspond to four oxidation peaks at similar voltages. Each peak represents the reversible reaction between ε-VOPO$_4$ and ε-Li$_2$VOPO$_4$ that correspond to the voltage plateaus found upon galvanostatic charge and discharge cycling. Starting from the OCV point at 3.9 V, there is a single oxidation peak at 3.7 V that indicates electrochemical lithiation from ε-VOPO$_4$ to ε-LiVOPO$_4$. As the scan rate test moves to the low voltage region, there are three additional oxidation peaks. Each of the peaks signify the transition from ε-LiVOPO$_4$ to ε-Li$_2$VOPO$_4$ with intermediate stages in between. ε-LiVOPO$_4$ becomes ε-Li$_{1.5}$VOPO$_4$ at ~2.5 V, then it converts to ε-Li$_{1.75}$VOPO$_4$ at ~2.25 V and finally becomes ε-Li$_2$VOPO$_4$ at ~2.0 V. Reduction peaks appear as the voltage continues to sweep from the low to high voltage domain, indicating that the V$^{5+}$ oxidation state of ε-VOPO$_4$ was recovered from V$^{3+}$ of ε-Li$_2$VOPO$_4$. From ε-Li$_2$VOPO$_4$, it becomes ε-Li$_{1.75}$VOPO$_4$ at ~2.1 V, then ε-Li$_{1.5}$VOPO$_4$ at ~2.25 V and ε-LiVOPO$_4$ at ~2.5 V. No further reaction takes place until ~4.25 V where ε-LiVOPO$_4$ further reduces to become ε-VOPO$_4$.

FIGS. 5A and 5B show that even at a faster rate, ε-VOPO$_4$ can still deliver a discharge capacity of ~305 mAh/g for up to 40 cycles at C/20. The long high voltage plateau extending past 100 mAh/g is preserved and each of the characteristic steps in the low voltage region are clearly sustained with no signs of diminishing for up to 30 cycles. In FIG. 4A, the drop from the high voltage region to the low voltage region evolved to a slope-like curve, which helps make up for the shorter high voltage plateau in the beginning but might indicate a little hysteresis. In subsequent cycles, the high voltage plateau slightly increases. The capacity of the 1$^{st}$ high voltage discharge plateau was ~125 mAh/g and by the 35$^{th}$ cycle, it increased to ~150 mAh/g which is equivalent to 1 Li. The low voltage region seems to show the opposite trend. As the high voltage plateau starts to increase in capacity, the low voltage steps start to decrease as well to maintain the overall discharge capacity at ~305 mAh/g.

Cycling of ε-VOPO$_4$ has been separated at the high voltage region and the low voltage region to study the stability of the electrochemical curve and capacity without the influence of each other. FIGS. 6A and 6B show ε-VOPO$_4$ cycled in the low voltage region to study how long-term cycling affects the shape and length of these three distinct plateaus at 2.5 V, 2.25 V and 2.0 V which is in agreement with DFT calculations confirming the two intermediate phases at x=1.5 and 1.75 in the low-voltage regime [12]. The initial discharge curve in FIG. 6A is different because the cell was discharged from OCV first, delivering more than 300 mAh/g. Even after 30 cycles, FIG. 6A shows that each voltage step is clearly distinguished, delivering a reversible capacity of ~160 mAh/g, correlating to 1 Li. From then on, the cell was continuously charged and discharged in the low voltage window, from 1.6 V to 3.0 V. FIG. 6B shows that the low voltage steps maintained ~160 mAh/g for up to 30 cycles with no sign of decay at all, suggesting good kinetics at the low voltage region. The charge-discharge profiles with steps agree with many reports, giving evidence to the existence of intermediate phases of ε-Li$_x$VOPO$_4$ where x=1.5 and 1.75.

Figure 7A:
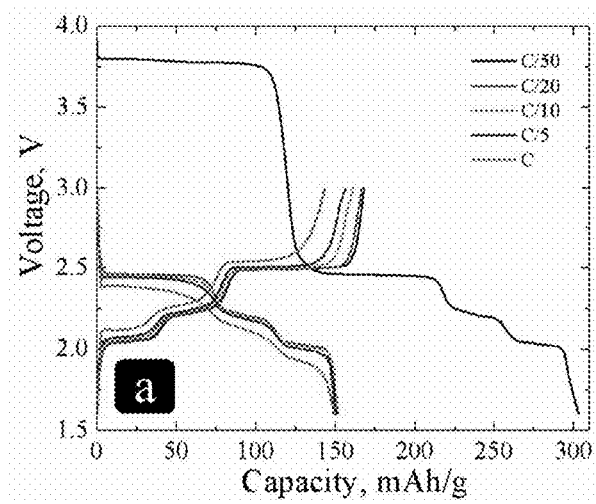
FIG. 7A shows cycling curves of ε-VOPO$_4$ in the low voltage region, from 1.6-3.0 V, at different rates.
Figure 7B:
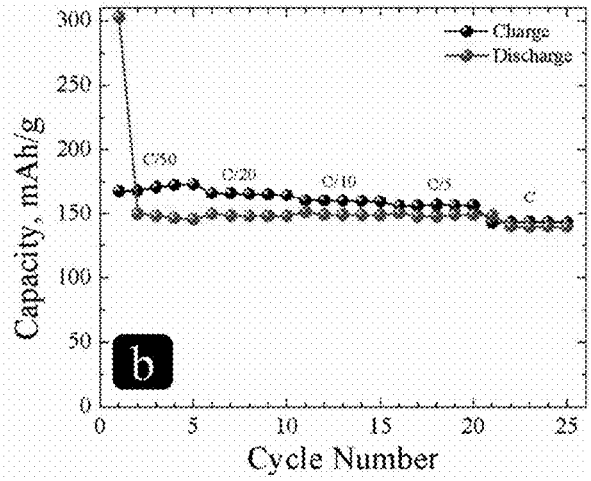
FIG. 7B shows rate test capacities of ε-VOPO$_4$ in the low voltage region, from 1.6 to 3.0 V.

A rate test in the low voltage region was performed to study how faster cycling can affect the plateaus at 2.5 V, 2.25 V and 2.0 V, as shown in FIGS. 7A and 7B. To start the rate test at the low voltage region, the cell was first discharged from OCV to 1.6 V at C/50, delivering a discharge capacity of over 300 mAh/g. From C/50 to C/5, the low voltage plateaus still maintained a discharge capacity of ~150 mAh/g with clearly defined step-like features, as shown in FIG. 7A. When the rate increased to 1 C, the discharge capacity is still ~150 mAh/g but the plateaus are more slope-in shape at slightly lower voltages. As the cycling rate increases, the difference between the charge and discharge capacities decreases, as shown in FIG. 7B. From C/50, the charge capacity is 175 mAh/g while the discharge is ~150 mAh/g. When the rate increased to 1 C, the charge and discharge capacities are ~150 mAh/g, thereby increasing the coulombic efficiency to ~100%. When cycled at the low voltage range, ε-VOPO$_4$ can reversibly intercalate one full lithium ion at the low voltage region, even at faster cycling rates.

Figure 8A:
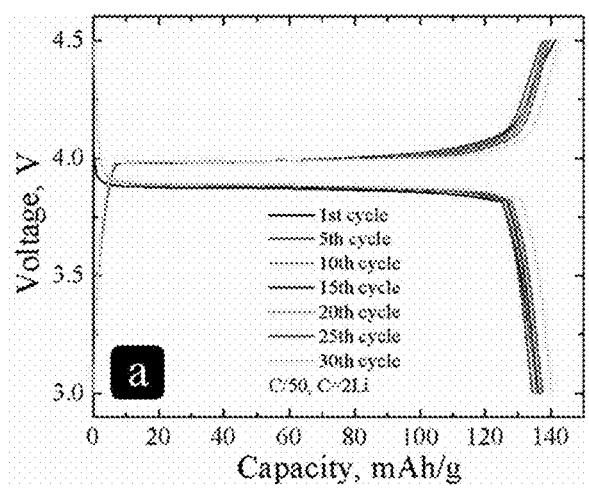
FIG. 8A shows galvanostatic charge-discharge curves of ε-VOPO$_4$ at the high voltage region, from 3.0 to 4.5 V.
Figure 8B:
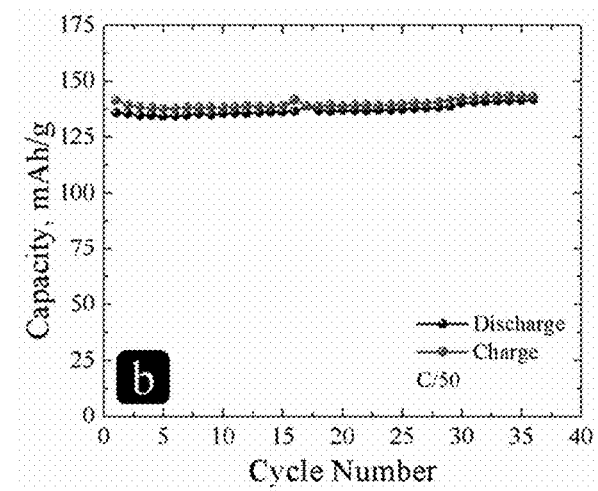
FIG. 8B shows cycle performance in the high voltage region, 3.0-4.5 V, of ε-VOPO$_4$ at C/50, 1 C=2Li.

FIGS. 8A and 8B show ε-VOPO$_4$ cycled in the high voltage region, from 3.0 V to 4.5 V, to study how long-term cycling affects the shape and capacity. In this high voltage window, there is a plateau at ~4.0 V that coincides with the V$^{3+/4+}$ redox where ε-VOPO$_4$↔LiVOPO$_4$. This high voltage plateau delivers a reversible capacity of ~140 mAh/g for up to 35 cycles which is close to 0.93 Li. This exceeds the previously reported results, where only 0.83 Li was inserted into ε-VOPO$_4$ and 0.65 Li was inserted into ε-LiVOPO$_4$. [11,12] After 30 cycles, the capacity slowly climbs to 150 mAh/g which corresponds to 1 Li which agrees with the trend in the galvanostatic charge-discharge curves in FIG. 4. Even after 30 cycles, FIG. 8B shows that ε-VOPO$_4$ delivers a reversible capacity of ~150 mAh/g, correlating to 1 Li. This plateau is step-like with no signs of fading after many cycles, suggesting easy reversible intercalation.

Figure 9A:
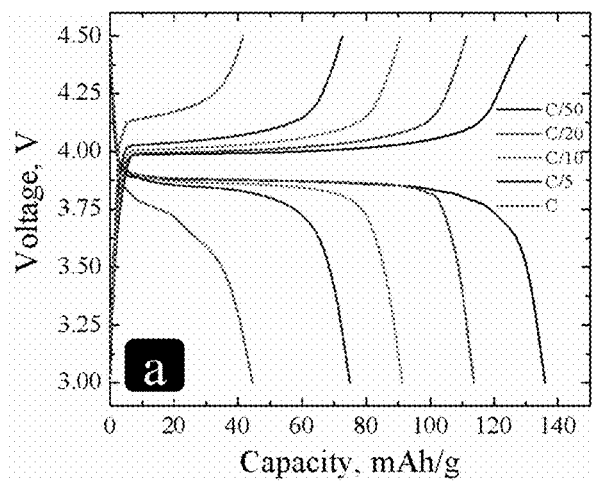
FIG. 9A shows Cycle curves of ε-VOPO$_4$ at high voltage region, from 3.0 to 4.5 V, at different current rates.
Figure 9B:
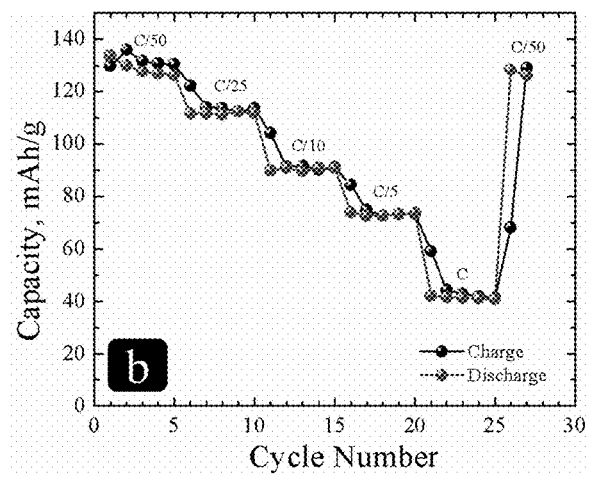
FIG. 9B shows rate test capacities of ε-VOPO$_4$ in the low voltage region, from 3.0 to 4.5 V.
Figure 10:
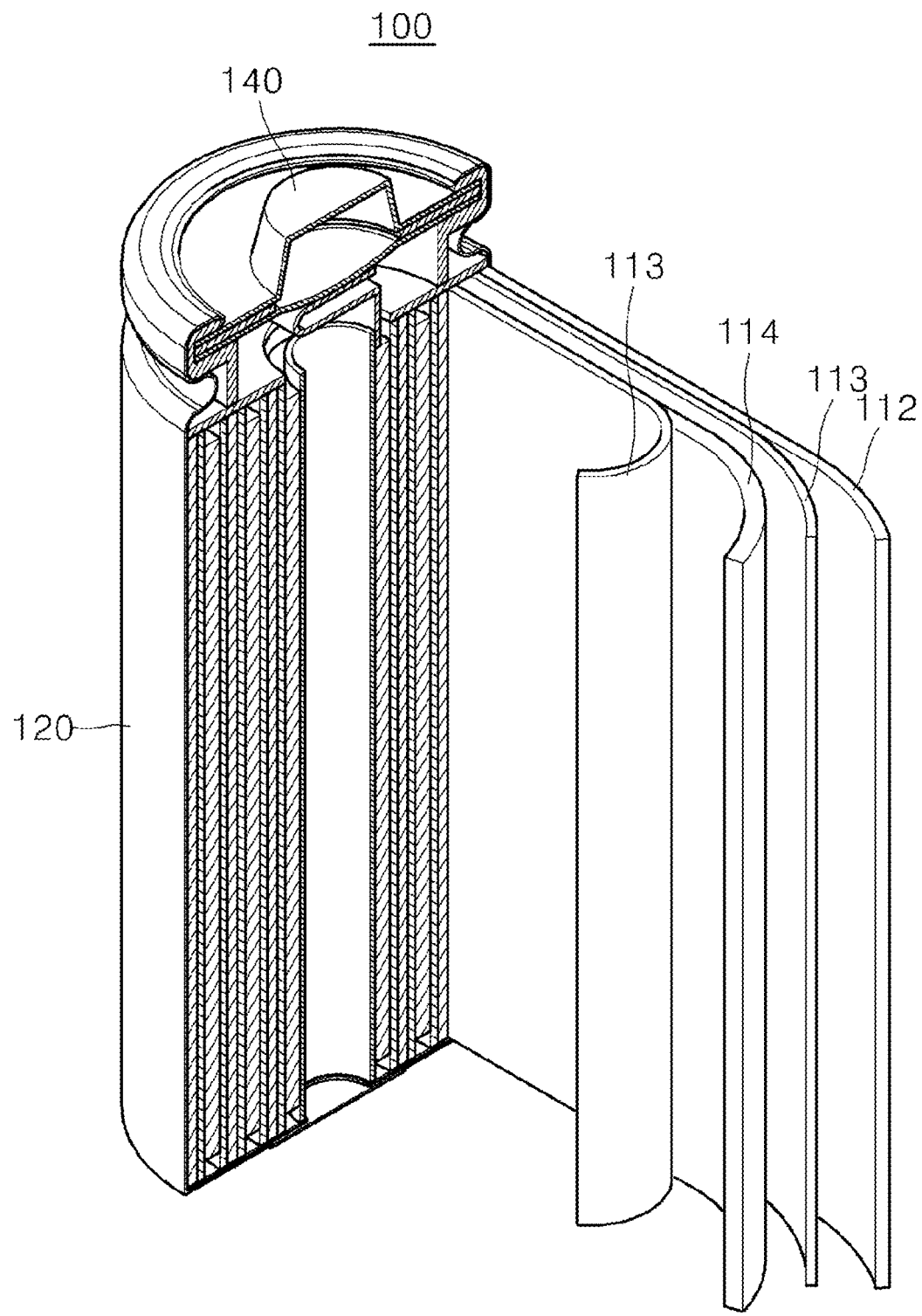
FIG. 10 is an exploded perspective view of a lithium secondary battery according to an embodiment.

FIGS. 9A and 9B show how different rates can affect the high voltage plateau of ε-VOPO$_4$ at ~4.0 V. At C/50, the discharge capacity is around 130 mAh/g and the capacity decreases as the rate gets faster. By 1 C, the discharge capacity dropped to around 40 mAh/g. Despite the fast rate cycling of 1 C, the cell could deliver the high discharge capacity of 140 mAh/g after it was cycled back to C/50. This suggests that the structure was preserved, even at fast cycling, and can maintain a high discharge capacity when it was cycled back to C/50 from 1 C. It also seems that faster cycling leads to higher coulombic efficiency. It is evident that from C/50 to C, the coulombic efficiency increases. From C/25, some of the charge and discharge capacities are overlapping and by C/10, C/5 and C, the discharge capacities are practically the same as the charge. This means that at faster rates, it can de/intercalate lithium ion more efficiently.

CONCLUSIONS

The optimized morphology and nano particle size of ε-VOPO$_4$ is studied, as well as observations from transmission electron microscope to analyze the good carbon conductive network. By combining complementary characterization techniques of SEM, XRD and extensive electrochemical studies, the reversibility reaction of ε-VOPO$_4$ as a cathode material for lithium-ion batteries is elucidated.

Throughout this description all ranges described include all values and sub-ranges therein, unless otherwise specified. Additionally, the indefinite article "a" or "an" carries the meaning of "one or more" throughout the description, unless otherwise specified. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

REFERENCES

1. M. S. Whittingham, Chem. Rev. 2014, 104, 4271-4301.
2. M. Winter, R. J. Brodd, Chem. Reviews, 2004, 104, 4245-4270.
3. B. C. Melot, J. M. Tarascon, Acc. Chem. Res., 2013, 46, 1226-1238.
4. M. S. Whittingham, Chem. Rev. 2014, 114, 11414-11443.
5. K. Zaghib, A. Mauger, F. Gendron, C. M. Julien, Chem. Mater., 2008, 20, 462-469.
6. H. Liu, F. C. Strobridge, 0. J. Borkiewicz, K. M. Wiaderek, K. W. Chapman, P. J. Chupas, C. P. Grey, Science, 2014, 344, 1252817.
7. G. Hautier, A. Jain, S. P. Ong, B. Kang, C. Moore, R. Doe, G. Ceder, Chem. Mater. 2011, 23, 3495-3508.
8. B. Wen, Q. Wang, Y. C. Lin, N. A. Chernova, K. Kharki, Y. Chung, F. Omenya, S. Sallis, L. F. J. Piper, S. P. Ong, M. S. Whittingham, Chem. Mater, 2016, 9, 3159-3170.
9. S. C. Lim, J. T. Vaughey, W. T. A. Harrison, L. L. Dussack, A. J. Jacobson, J. W. Johnson, Solid State Ionics 1996, 84, 219-226.
10. T. A. Kerr, Solid-State Lett. 1999, 3, 460.
11. Song, Y; Zavalij, P. Y; Whittingham, M. S J. El Daroch An. Soc. 2005, 152, A721.
12. Y. C. Lin, B. Wen, K. M. Wiaderek, S. Sallis, H. Liu, S. H. Lapidus, 0. J. Borkiewicz, N. F. Quackenbush, N. A. Chernova, K. Karki, F. Omenya, P. J. Chupas, L. F. J. Piper, M. S. Whittingham, K. W. Chapman, and S. P. Ong, Chem. Mater., 2016, 28, 1794-1805.
13. Z. Chen, Q. Chen, L. Chen, R. Zhang, H. Zhou, N. A. Chernova, M. S. Whittingham, J. Electrochem. Soc. 2013, 160, A1777-A1780.
14. B. M. Azmi, H. S. Munirah, T. Ishihara, Ionics, 2005, 11.
15. M. Bianchini, J. M. Ateba-Mba, P. Dagault, E. Bogdan, D. Carlier, E. Suard, C. Masquelier, L. Croguennec, J. Mater. Chem. A, 2014, 2, 10182-10192.
16. K. L. Harrison, C. A. Bridges, C U. Segre, C. D. Varnado Jr., D. Applestone, C. W. Bielawski, M. P. Paranthaman, A. Manthiram, Chem. Mater., 2014, 26, 3849-3861.

What is claimed is:

1. An intercalation electrode composition for a lithium ion battery cathode comprising a transition metal phosphate, in which a transition metal ion undergoes a change in oxidation state of two between a charged state filled with intercalated lithium ions and discharged state depleted of intercalated lithium ions, having a capacity of at least 275 mAh/g at a discharge rate of C/20.

2. The intercalation electrode composition according to claim 1, having a capacity of at least 290 mAh/g.

3. The intercalation electrode composition according to claim 1, having a capacity of at least 305 mAh/g.

4. The intercalation electrode composition according to claim 1, having a discharge capacity of at least 90% of a theoretical value for the discharge capacity of the intercalation electrode composition based on an amount of the transition metal which undergoes the change in oxidation state.

5. The intercalation electrode composition according to claim 1, wherein the transition metal is vanadium and the intercalation electrode composition comprises $VOPO_4$.

6. The intercalation electrode composition according to claim 1, wherein the transition metal is vanadium and the intercalation electrode composition comprises principally $\varepsilon$-$VOPO_4$ and at least one of graphene and carbon nanotubes, having an energy capacity of at least 850 mWh/g.

7. The intercalation electrode composition according to claim 1, wherein the transition metal is vanadium and the intercalation electrode composition comprises principally $\varepsilon$-$VOPO_4$ and up to 10% by weight graphene.

8. The intercalation electrode composition according to claim 1, wherein the transition metal is vanadium and the intercalation electrode composition comprises at least 75% by weight $\varepsilon$-$VOPO_4$, at least 5% by weight graphene nanoplatelets, and at least 5% by weight of a binder.

9. The intercalation electrode composition according to claim 1, wherein the transition metal is vanadium and the intercalation electrode composition comprises 75% by weight $\varepsilon$-$VOPO_4$, 15% by weight graphene nanoplatelets, and 10% by weight of a poly vinylidene fluoride (PVDF) binder.

10. The intercalation electrode composition according to claim 1, configured to form a cathode in a battery, the battery further comprising:
   a lithium or lithium ion anode;
   an electrolyte adapted to operate at a battery potential of at least 4.5 V;
   a separator; and
   a supporting lithium salt.

11. The intercalation electrode composition according to claim 1, having:
   a first state in which at least 80 mol % of the transition metal ions are oxidized in a first oxidation state and associated with two lithium ions per transition metal ion, and
   a second state in which at least 80 mol % of the transition metal ions are oxidized in a second oxidation state which differs by two from the first oxidation state.

12. The intercalation electrode composition according to claim 1, having a dual lithium ion exchange characteristic, having a capacity of about 125 mAh/g at a discharge rate of C/20 while maintaining a voltage exceeding 3.7 V.

13. The intercalation electrode composition according to claim 1, having a dual lithium ion exchange characteristic, having an energy capacity of at least 850 mWh/g and a capacity of at least 290 mAh/g.

14. A lithium ion battery cathode composition, comprising $\varepsilon$-$VOPO_4$ with intercalated lithium ions, electrically conductive graphene, and a binder, having a capacity of at least 125 mAh/g while maintaining a voltage exceeding 3.7 V, at a discharge rate of C/20, on a current collector substrate.

15. The lithium ion battery cathode composition according to claim 14, having a theoretical capacity of 305 mA/g and an observed capacity of at least 275 mAh/g.

16. The lithium ion battery cathode composition according to claim 14,
   consisting essentially of the $\varepsilon$-$VOPO_4$ with intercalated lithium ions, electrically conductive forms of carbon comprising the electrically conductive graphene, and the binder, wherein the conductive graphene comprises graphene nanoplatelets, the graphene nanoplatelets comprising at least 3% by weight of the $VOPO_4$, having an energy density of at least 880 mWh/g, and a capacity of at least 300 mAh/g.

17. The lithium ion battery cathode composition according to claim 14, having a current-voltage profile which displays voltage plateaus on discharge at a discharge rate of C/20, at about 2.1 V, 2.25 V, 2.5 V, and 3.9 V representing a dual-lithium ion exchange per vanadium ion characteristic of at least 90%.

18. A lithium ion battery cathode, comprising:
an intercalation crystal material consisting essentially of solvothermally generated $\epsilon$-$VOPO_4$;
graphene nanoplatelets;
a binder; and
a current collector coated with a slurry of a mixture of the $\epsilon$-$VOPO_4$, graphene nanoplatelets, and the binder,
wherein the lithium ion battery cathode has a dual-lithium ion exchange per vanadium ion characteristic of at least 90%.

19. The lithium ion battery cathode according to claim 18, wherein the graphene nanoplatelets have a surface area of at least 100 $m^2$/g and the binder is polyvinylidene fluoride.

20. The lithium ion battery cathode according to claim 19, wherein:
the graphene nanoplatelets are present in an amount of between 5% and 15% by weight; and
the vanadium undergoes a change in oxidation state between a first state in which at least 80 mol % of the vanadium is oxidized in a first oxidation state and associated with two lithium ions per vanadium, and a second state in which at least 80 mol % of the vanadium is oxidized in a second oxidation state which differs by two from the first oxidation state and is associated with zero lithium ions per vanadium, having at a discharge rate of C/20:
a capacity of at least 290 mAh/g between 4.5V and 1.6V,
a capacity of about 125 mAh/g between 4.5V and 3.7V,
an energy capacity of at least 850 mWh/g, and a
current-voltage profile which displays voltage plateaus on discharge at a discharge rate of C/20, at about 2.1 V, 2.25 V, 2.5 V, and 3.9 V.

\* \* \* \* \*